(12) United States Patent
Kochis

(10) Patent No.: US 7,196,621 B2
(45) Date of Patent: Mar. 27, 2007

(54) TRACKING SYSTEM AND ASSOCIATED METHOD

(75) Inventor: Gary Kochis, Uniontown, OH (US)

(73) Assignee: Argo-Tech Corporation, Cleveland, OH (US)

( * ) Notice: Subject to any disclaimer, the term of this patent is extended or adjusted under 35 U.S.C. 154(b) by 0 days.

(21) Appl. No.: 10/565,288

(22) PCT Filed: May 6, 2004

(86) PCT No.: PCT/US2004/014025

§ 371 (c)(1),
(2), (4) Date: Jan. 20, 2006

(87) PCT Pub. No.: WO2005/022292

PCT Pub. Date: Mar. 10, 2005

(65) Prior Publication Data

US 2006/0187026 A1    Aug. 24, 2006

Related U.S. Application Data

(60) Provisional application No. 60/378,283, filed on May 7, 2002.

(51) Int. Cl.
*G08B 1/08*    (2006.01)
(52) U.S. Cl. .............. 340/539.13; 340/539.15; 340/539.16; 340/572.4; 340/945; 340/948; 340/950; 340/985; 701/14; 701/29; 701/35
(58) Field of Classification Search ........... 340/539.13, 340/539.15, 539.16, 572.1, 572.4, 945, 948, 340/950, 985; 701/14, 29, 35
See application file for complete search history.

(56) References Cited

U.S. PATENT DOCUMENTS 5,588,005 A    12/1996 Ali et al.

(Continued)

FOREIGN PATENT DOCUMENTS

CN    1261243 A    7/2000

(Continued)

OTHER PUBLICATIONS

Crains Cleveland, NE Ohio CrainTech, *Mizar positioning itself in GPS market*, Jan. 24, 2001 (2 pages).

(Continued)

*Primary Examiner*—Tai Nguyen
(74) *Attorney, Agent, or Firm*—Fay Sharpe LLP

(57) ABSTRACT

A tracking system (10) for tracking movable assets (16) and several methods for using the system are provided. The tracking system includes a monitoring device (22), a tracking information network (20), a data communication network (18), a tracker tag (12), and a tracking information server (14). The tracker tag uses GPS technology. The tracking information server provides programmed instructions to the tracker tag in messages via a messaging system. The tracker tag selectively retrieves the messages from the messaging system. The tracking information server provides tracking information and related information to a subscriber. In one embodiment, the tracker tag is in communication with an Iridium satellite constellation (28) and tracking information is displayed to the subscriber when the asset is substantially anywhere in the world. In another embodiment, the monitoring device is in communication with the Iridium satellite constellation and tracking information is displayed to the subscriber when the subscriber is substantially anywhere in the world, preferably via the Internet (36).

40 Claims, 21 Drawing Sheets

U.S. PATENT DOCUMENTS

| | | | |
|---|---|---|---|
| 5,608,412 | A | 3/1997 | Welles, II et al. |
| 5,629,693 | A | 5/1997 | Janky |
| 5,633,875 | A | 5/1997 | Hershey et al. |
| 5,682,139 | A | 10/1997 | Pradeep et al. |
| 5,686,888 | A | 11/1997 | Welles, II et al. |
| 5,691,980 | A | 11/1997 | Welles, II et al. |
| 5,752,218 | A | 5/1998 | Harrison et al. |
| 5,835,377 | A | 11/1998 | Bush |
| 5,864,315 | A | 1/1999 | Welles, II et al. |
| 5,889,474 | A | 3/1999 | LaDue |
| 5,917,433 | A | 6/1999 | Keillor et al. |
| 5,959,529 | A | 9/1999 | Kail, IV |
| 5,974,349 | A | 10/1999 | Levine |
| 6,067,044 | A | 5/2000 | Whelan et al. |
| 6,069,570 | A | 5/2000 | Herring |
| 6,072,396 | A | 6/2000 | Gaukel |
| 6,108,524 | A | 8/2000 | Hershey et al. |
| 6,144,916 | A | 11/2000 | Wood, Jr. et al. |
| 6,184,801 | B1 | 2/2001 | Janky |
| 6,243,039 | B1 * | 6/2001 | Elliot ................. 342/457 |
| 6,311,060 | B1 | 10/2001 | Evans et al. |
| 6,339,397 | B1 | 1/2002 | Baker |
| 6,377,210 | B1 | 4/2002 | Moore |
| 6,392,692 | B1 | 5/2002 | Monroe |
| 6,456,937 | B1 | 9/2002 | Doner et al. |
| 6,490,523 | B2 | 12/2002 | Doner |
| 6,510,380 | B1 | 1/2003 | Curatolo et al. |
| 6,512,478 | B1 | 1/2003 | Chien |
| 6,519,529 | B2 | 2/2003 | Doyle |
| 6,545,601 | B1 | 4/2003 | Monroe |
| 6,553,336 | B1 | 4/2003 | Johnson et al. |
| 2001/0009407 | A1 | 7/2001 | Honda et al. |
| 2002/0006800 | A1 | 1/2002 | Mohi |
| 2002/0030596 | A1 | 3/2002 | Finn et al. |
| 2002/0055924 | A1 | 5/2002 | Liming |
| 2002/0089434 | A1 | 7/2002 | Ghazarian |
| 2002/0111819 | A1 | 8/2002 | Li et al. |
| 2002/0116123 | A1 | 8/2002 | Lampe et al. |
| 2002/0128769 | A1 | 9/2002 | Der Ghazarian et al. |
| 2002/0169539 | A1 | 11/2002 | Menard et al. |
| 2002/0177476 | A1 | 11/2002 | Chou |
| 2003/0050038 | A1 | 3/2003 | Haave et al. |
| 2003/0069648 | A1 | 4/2003 | Douglas et al. |

FOREIGN PATENT DOCUMENTS

| | | |
|---|---|---|
| CN | 1277362 A | 12/2000 |
| EP | 1 152 478 B1 | 7/2001 |
| EP | 1 184 829 A2 | 3/2002 |
| JP | 2000 162300 | 6/2000 |
| JP | 2000 196744 | 7/2000 |
| JP | 2000 214771 | 11/2000 |

OTHER PUBLICATIONS

*Iridium Satellite Proposes Real-Time Cockpit Voice and Flight Data Monitoring to Federal Aviation Administration*, Iridium Satellite LLC, <http://www.iridium.com/corp/iri_corp-news.asp?newsid=25>, Oct. 2, 2001 (5 pages).

* cited by examiner 79, 104

```
1   TRACKER TAG ID=123456789;
2   # CHANGE IN STATE CONDITION;
3   CISC POSITION;
4   CISC TIME;
5   CISC VIBRATION::TRANSITION ENGINE OFF TO RUNNING;
6   CISC VIBRATION::TRANSITION ENGINE RUNNING TO OFF AND REMAINING
7   OFF 10 MINUTES;
8   CISC TEMPERATURE:: RISING TRANSITION TO > 40 F;
9   CISC TEMPERATURE:: FALLING TRANSITION TO < 40 F AND REMAINING < 40
10  F 5 MINUTES;
11  CISC SELF-TEST-PASS:: YES;
12  CISC SELF-TEST-FAIL:: YES;
13  CISC PAGE;
14  # DATA ACQUSITION CONDITION;
15  DAC POSITION:: ON VIBRATION CHANGE IN STATE, PERIODIC 10 MINUTES
16  WHILE ENGINE RUNNING;
17  DAC TIME:: ON VIBRATION CHANGE IN STATE, PERIODIC 10 MINUTES
18  WHILE ENGINE RUNNING;
19  DAC VIBRATION:: ON VIBRATION CHANGE IN STATE, ALSO ACQUIRE
20  POSITION, ALSO ACQUIRE TIME;
21  DAC TEMPERATURE:: ON TEMPERATURE CHANGE IN STATE, PERIODIC 5
22  MINUTES WHILE > 40 F, ALSO ACQUIRE POSITION, ALSO ACQUIRE TIME;
23  DAC SELF-TEST-PASS:: ON SELF-TEST-PASS CHANGE IN STATE, ALSO
24  ACQUIRE POSITION, ALSO ACQUIRE TIME;
25  DAC SELF-TEST-FAIL:: ON SELF-TEST-FAIL CHANGE IN STATE, ALSO
26  ACQUIRE POSITION, ALSO ACQUIRE TIME;
27  DAC PAGE;
28  # DATA DOWNLOAD CONDITION;
29  DDC POSITION;
30  DDC TIME;
31  DDC VIBRATION:: ON VIBRATION CHANGE IN STATE, PERIODIC 8 HOURS
32  WHILE ENGINE RUNNING, ALSO DOWNLOAD ALL;
33  DDC TEMPERATURE:: ON TEMPERATURE CHANGE IN STATE, PERIODIC 5
34  MINUTES WHILE > 40 F, ALSO DOWNLOAD POSITION AND TIME;
35  DDC SELF-TEST-PASS;
36  DDC SELF-TEST-FAIL:: ON SELF-TEST-FAIL CHANGE IN STATE, ALSO
37  DOWNLOAD POSITION AND TIME;
38  DDC PAGE:: USER 123 FOR ALL DATA DOWNLOAD CONDITIONS;
39  DDC PAGE:: USER 456 FOR SELF-TEST-FAIL DATA DOWNLOAD CONDITION;
```

FIG. 21

TRACKING SYSTEM AND ASSOCIATED METHOD

This application is a 371 national filing of PCT/US2004/14025, filed on May 6, 2004 which is a contiuation-in-part application of PCT/US2003/14483, filed May 6, 2003 (U.S. Ser. No. 10/513,839, filed Nov. 5, 2004) and which claims benefit of 60/378,283, filed on May 7, 2002.

BACKGROUND OF THE INVENTION

The invention relates to a system for tracking movable assets and a method for using the system. It finds particular application in conjunction with a tracking device that operates using global positioning system technology and a tracking information server that provides tracking information along with various types of supplemental information to a subscriber and will be described with particular reference thereto. However, it is to be appreciated that the invention is also amenable to other applications. For example, monitoring certain environmental and operating characteristics associated with the asset and controlling certain operations of the asset.

It is common to provide transponders and/or black boxes on commercial airliners and some general aviation aircraft. The transponders and/or black boxes record either a location of an aircraft and/or activities occurring within the aircraft. While such systems are useful to obtain information for aircraft flight and operation, drawbacks exist in technology as it is now implemented. These drawbacks include a relatively low level of interaction between aircraft at various stages of a flight pattern, including the stages from taxiing and take-off through airborne flight patterns to landing. Further, these systems are commonly controlled and interconnected to the electronic infrastructure of the airliner or aircraft. Such a design provides the potential for disablement of these systems, for example, if intruders obtain unauthorized control of the aircraft Some U.S. patents related to tracking aircraft and other objects are identified below.

U.S. Pat. No. 6,545,601 to Monroe discloses a security and surveillance system for aircraft on the ground that incorporates a plurality of strategically spaced sensors including video imaging generators, audio sensors, motion detectors, and fire and smoke detectors for monitoring critical components and critical areas of both the interior and the exterior of the a commercial transport such as an aircraft. The captured data and images are transmitted to a ground based security station for display on a monitor and may be recorded on a "black box" recorder as well as on a ground based recording system. The multiple audio and image signals are multiplexed and sequenced utilizing split screen technology in order to minimize the recording and monitoring hardware required to process the images.

U.S. Pat. No. 6,519,529 to Doyle discloses a system for tracking and monitoring the intermodal status of cargo trailers. In addition to the information provided by a Global Positioning System (GPS) unit, the system monitors the status of various sensors on the trailer. The GPS unit provides the location and velocity of a trailer. A wheel monitoring unit provides the status of the wheels of the trailer, specifically whether there is rotation of the wheels or not Anti-lock braking systems are used to provide signal information indicative of the wheel rotation status. An independent wheel rotation sensor is also used to provide the wheel rotation status. A computer processor determines the intermodal movement status of the trailer using the wheel rotation status and the location and velocity information.

U.S. Pat. No. 6,510,380 to Curatolo et al. discloses a security and tracking apparatus, comprising at least two signaling units in communicating proximity, and means for identifying the location of the signaling units. In one embodiment, a security and tracking apparatus is provided, comprising at least two signaling units in communicating proximity, and means for identifying and automatically transmitting the location of the signaling units when the signaling units are separated by more than a preselected distance. In a preferred embodiment, a method is provided to locate a person, an animal, or a material asset, comprising providing in contact with the person, animal, or material asset, at least two signaling units in communicating proximity, wherein at least one signaling unit is small and hidden and securely attached to the person, animal, or material asset, and the signaling units having means for identifying the location of the signaling units to a monitoring station; activating means for identifying the location of the signaling units by referencing the GPS system; and notifying the monitoring station of said geographic location.

U.S. Pat. No. 6,490,523 to Doner discloses a method and apparatus for managing locomotives. The apparatus includes an on-board tracking system including a locomotive interface, a computer, a GPS receiver, and a communicator, the computer programmed to determine a position of the locomotive and to transmit the position via the communicator, the computer further programmed to obtain locomotive discretes and to transmit the locomotive discretes via the communicator. The method includes the steps of operating each on-board system to determine when its respective locomotive departs a locomotive assignment point, operating the on-board systems to determine a departure condition, to send a locomotive position message to a data center at a time corresponding to the locomotive assignment point, to simultaneously collect GPS location data for each respective locomotive and at the data center, collecting locomotive position messages corresponding to the locomotive assignment point to determine localized groups of locomotives, identifying candidate consists and lead locomotives.

U.S. Pat. No. 6,339,397 to Baker discloses a portable self-contained tracking unit that includes an enclosure attached to a mounting plate, with a hollow interior cavity housing a GPS receiver, a microprocessor and a transmitter. The GPS receiver will receive tracking data and the microprocessor will process the tracking data into a data packet The transmitter transmits the data packet to a remote receiving station, for transmission to a central database. Photoelectric cells are mounted on the enclosure to recharge batteries which provide power to the electrical components of the tracking unit. The enclosure is designed with a pair of vertically oriented side panels which are generally orthogonally oriented so that the solar panels mounted on the side panels will maintain a favorable solar incidence angle during a wide range of orientations. The transmitter is a cellular telephone with an antenna mounted within the enclosure but spaced a distance from the metal mounting plate and electrical components approximately one-quarter wavelength of the operating frequency of the transmitter. The enclosure is formed of a radio frequency and optically transparent material, so that the antenna and the solar panels may be housed within the hollow interior cavity of the enclosure. In the method of the invention, tracking data is periodically transmitted via cellular phone to a cellular service provider, thence to a data service bureau which sends the data over the Internet to the database of a central server computer. The central server computer will decode the information and provide an interface and value added products such as maps and reports for customers via a web page on the Internet.

Currently, each general aviation aircraft (about four hundred thousand (400,000) in the United States) is asked to volunteer compliance with the transponder positioning systems that are currently in place. Only one-third (⅓) of the general aviation aircraft comply. The other two-thirds (⅔) are either not equipped with a transponder or do not comply for other reasons.

In reviewing the existing technology, it is desirable to create a tracking system that increases the intelligence and interactive service communication between, for example, an aircraft and ground stations during its flight pattern, as well as to insure independence in the communication between the aircraft and ground stations. It is desirable to provide a reliable and cost effective method to track, for example, aircraft, with a unique aircraft number, any time during idle time, taxiing, and in flight. It is also deemed desirable to provide interactive service communications and independent communications of the aforementioned type to other modes of transportation as well, such as various forms of air, ground, and water transportation.

SUMMARY OF THE INVENTION

In one aspect, an apparatus for tracking a movable asset and providing tracing information to a monitoring device is provided. In one embodiment, the apparatus includes: a tracker tag adapted to selectively receive position data and time data from multiple global positioning system satellites of a global positioning system satellite constellation, the position data representing a position of each global positioning system satellite from which data was received with respect to center of Earth and the time data representing a time of day associated with the position data, the tracker tag disposed along an exterior of the movable asset at a location facilitating reception of the position data and time data, the tracker tag combining the position data from the multiple global positioning system satellites for selectively transmitting combined position data and time data via a data communication network, wherein the tracker tag is adapted to selectively retrieve a message with command and control information via the data communication network, wherein the tracker tag is inoperative from equipment associated with the asset and a tracking information server for command and control of the tracker tag, wherein the tracking information server is adapted to selectively send the message with command and control information to the tracker tag via a messaging system, wherein the message is addressed to the tracker tag, wherein the messaging system is accessible to the tracker tag via the data communication network, wherein the tracking information server is adapted to receive the combined position data and time data from the tracker tag via the data communication network, wherein the tracking information server is adapted to selectively receive command and control information from the monitoring device via a tracking information network, wherein the tracking information server is adapted to selectively process the combined position data and time data based on programmed instructions and command and control information to produce the tracking information, wherein the tracking information is associated with the asset and selectively accessible to the monitoring device via the tracking information network.

In another aspect, a tracking system is provided. In one embodiment, the tracking system includes: a monitoring device for displaying tracking information associated with a movable asset, a tracking information network in communication with the monitoring device for communicating the tracking information to the monitoring device, a data communication network, a tracker tag adapted to selectively receive position data and time data from multiple global positioning system satellites of a global positioning system satellite constellation, the position data representing a position of each global positioning system satellite from which data was received with respect to center of Earth and the time data representing a time of day associated with the position data, the tracker tag disposed along an exterior of the movable asset at a location facilitating reception of the position data and time data, the tracker tag combining the position data and time data from the multiple global positioning system satellites for selectively transmitting combined position data and time data via the data communication network, wherein the tracker tag selectively retrieves command and control information via the data communication network and a tracking information server for command and control of the tracker tag, wherein the tracking information server selectively sends command and control information to the tracker tag via a messaging system, wherein the message is addressed to the tracker tag, wherein the messaging system is accessible to the tracker tag via the data communication network, wherein the tracking information server receives combined position data and time data from the tracker tag via the data communication network, wherein the tracking information server selectively receives command and control information from the monitoring device via the tracking information network, wherein the tracking information server selectively processes the combined position data and time data to produce the tracking information, wherein the tracking information is selectively accessible to the monitoring device via the tracking information network.

In yet another aspect, a method for monitoring sensor data associated with a moveable asset using a tracker tag in communication with a tracking information server is provided. In one embodiment, the method includes: a) attaching a tracker tag to the moveable asset, wherein the tracker tag is disposed along an exterior of the movable asset at a location in which the tracker tag has line of sight access to the sky during normal movement of the asset, wherein the tracker tag is inoperative from equipment associated with the asset, wherein the tracker tag includes an installed tag profile that includes programmed instructions to control current operation of the tracker tag, wherein the tracking information server includes a master tag profile that is re-configurable and at least initially the same as the installed tag profile, b) re-configuring the master tag profile at the tracking information server to create a next tag profile, wherein the next tag profile includes programmed instructions to control subsequent operation of the tracker tag, c) selectively sending the next tag profile to the tracker tag in a message via a messaging system, wherein the messaging system is accessible to the tracker tag via a data communication network, d) powering up the tracker tag, e) detecting a change in state condition with the tracker tag and responding to the change in state condition in accordance with the programmed instructions in the installed tag profile, wherein the response to the change in state condition includes retrieving the message with the next tag profile from the messaging system and installing the next tag profile in the tracker tag, wherein, upon installation, the next tag profile becomes the installed tag profile for control of current operations of the tracker tag, f) detecting a data acquisition condition with the tracker tag and responding to the data acquisition condition in accordance with the programmed instructions in the installed tag profile, wherein the response to the data acquisition condition includes acquiring and storing sensor data associated with at least one sensor of one or more sensors associated with the tracker tag, one or more sensors associated with the asset, and one or more sensors associated with a transport vehicle associated with the asset, and g) detecting a data download condition with the tracker tag and responding to the data download condition in accordance with the programmed instructions in the installed tag profile, wherein the response to the data download condition includes downloading the stored sensor data to the tracking information server via the data communication network, wherein the tracking information server processes the downloaded sensor data to create sensor information and displays the sensor information on a monitoring device via a tracking information network.

In still yet another aspect, a method for tracking a moveable asset using a tracker tag in communication with a tracking information server is provided. The method includes: a) attaching a tracker tag to the moveable asset, wherein the tracker tag is disposed along an exterior of the movable asset at a location in which the tracker tag has line of sight access to the sky during normal movement of the asset, wherein the tracker tag is inoperative from equipment associated with the asset, wherein the tracker tag includes an installed tag profile that includes programmed instructions to control current operation of the tracker tag, wherein the tracking information server includes a master tag profile that is re-configurable and at least initially the same as the installed tag profile, b) re-configuring the master tag profile at the tracking information server to create a next tag profile, wherein the next tag profile includes programmed instructions to control subsequent operation of the tracker tag, c) selectively sending the next tag profile to the tracker tag in a message via a messaging system, wherein the messaging system is accessible to the tracker tag via a data communication network, d) powering up the tracker tag, e) detecting a change in state condition with the tracker tag and responding to the change in state condition in accordance with the programmed instructions in the installed tag profile, wherein the response to the change in state condition includes retrieving the message with the next tag profile from the messaging system and installing the next tag profile in the tracker tag, wherein, upon installation, the next tag profile becomes the installed tag profile for control of current operations of the tracker tag, f) detecting a data acquisition condition with the tracker tag and responding to the data acquisition condition in accordance with the programmed instructions in the installed tag profile, wherein the response to the data acquisition condition includes acquiring and storing position data and time data associated with a global positioning system receiver in the tracker tag, and g) detecting a data download condition with the tracker tag and responding to the data download condition in accordance with the programmed instructions in the installed tag profile, wherein the response to the data download condition includes downloading the stored position data and time data to the tracking information server via the data communication network wherein the tracking information server processes the downloaded position data and time data to create tracking information and displays the tracking information on a monitoring device via a tracking information network.

Benefits and advantages of the invention will become apparent to those of ordinary skill in the art upon reading and understanding the description of the invention provided herein.

BRIEF DESCRIPTION OF THE DRAWINGS

The invention is described in more detail in conjunction with a set of accompanying drawings.

FIG. 21 is an exemplary tag profile with programmed instructions for change in state, data acquisition, and data download conditions.

DETAILED DESCRIPTION OF THE PREFERRED EMBODIMENT

Figure 1:
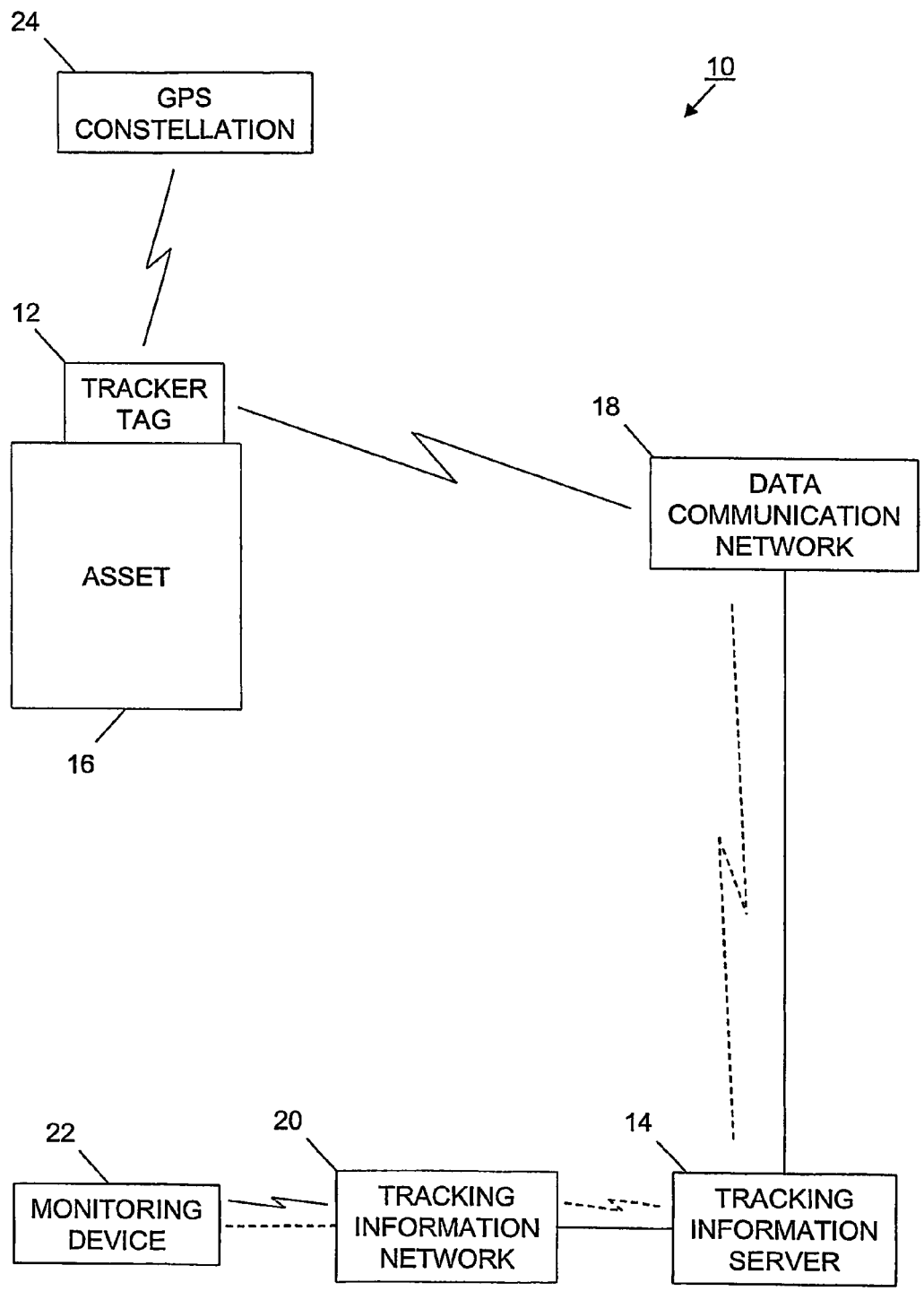
FIG. 1 is a block diagram of an embodiment of a tracking system incorporating the invention.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. Within the drawings, like reference numerals denote like elements.

Figure 3:
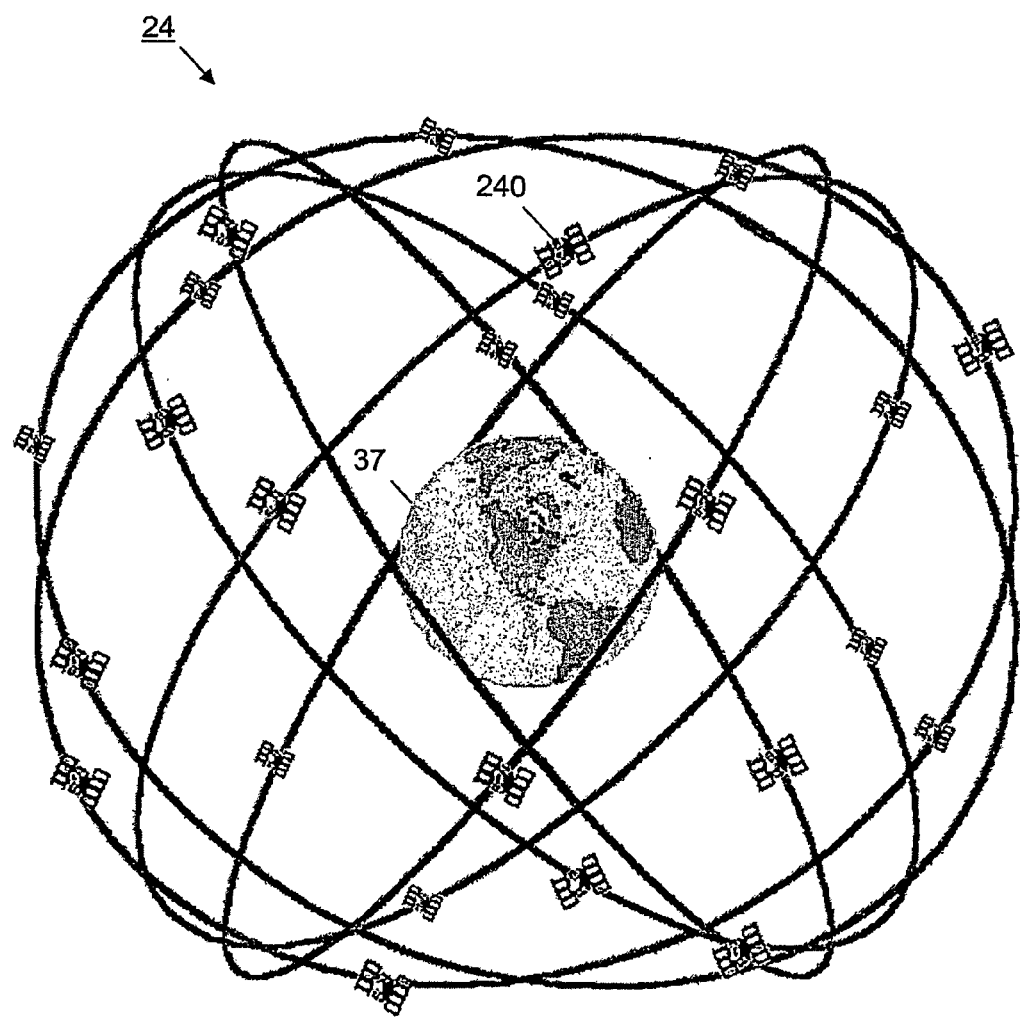
FIG. 3 depicts a GPS satellite constellation with multiple satellites in Earth orbit.

With reference to FIG. 1, an embodiment of a tracking system 10 includes a tracker tag 12, a tracking information server 14, an asset 16, a data communication network 18, a tracking information network 20, a monitoring device 22, and a GPS satellite constellation 24. The GPS satellite constellation 24 is preferably a public GPS satellite constellation including a plurality of GPS satellites 240 (FIG. 3)

orbiting the Earth. Each GPS satellite includes a clock and has an understanding of its own orbit with respect to the center of the Earth. Each GPS satellite continually broadcasts its position with respect to the center of the Earth and time with respect to a time of day reference.

GPS satellites are well known for enabling users with GPS receivers to locate their positions on or near the Earth. Such systems are commonly used for navigation in many different applications, such as aviation, nautical travel, automobile travel, etc. Preferably, the GPS satellite constellation 24 includes enough GPS satellites and the satellites are spaced apart so that from any point on Earth, four GPS satellites will be above the horizon. Equipment with a GPS receiver can determine its position with respect to the center of the Earth in longitude, latitude, and altitude from position and time data from four GPS satellites. If position and time data is received from three GPS satellites, the equipment can determine its position in longitude and latitude. The equipment can also determine its velocity from the position and time data.

One public GPS satellite constellation is the NAVSTAR GPS satellite constellation developed by the U.S. Department of Defense. The NAVSTAR GPS satellite constellation includes 27 GPS satellites (24 operational, 3 spare) orbiting at about 12,000 miles (19,300 km). The GPS satellites are dispersed around six planes with at least four GPS satellites in each plane. The orbits are arranged so that at any time anywhere on Earth, there are at least four GPS satellites above the horizon. Preferably, the GPS satellite constellation 24 is the NAVSTAR GPS satellite constellation. However, the tracking system 10 works just as well with any other public GPS satellite constellation, such as the GLONASS satellite constellation maintained by the Russian Federation or the Galileo satellite constellation introduced by European countries. The GPS satellite constellation 24 could also be a private satellite system.

Preferably, the asset 16 is a movable asset, such as an aircraft. However, the tracker tag 12 may be secured to any type of asset for which tracking information is desired. For example, a truck, a van, an automobile, a cargo container, a trailer, a bus, a train, a locomotive, a rail car, and a watercraft. The tracker tag 12 is secured to the asset 16 in a manner so that it normally has line of sight access to the sky. Preferably, the tracker tag 12 is removably secured to a top-side exterior of the asset 16 at its highest point However, any point with line of sight access to at least three or four GPS satellites is suitable. Access to at least four GPS satellite is required if altitude tracking information is desired. Preferably, the tracker tag 12 is positioned on the asset 16 so that no operators, crew, or passengers can access the tracker tag 12 during normal movement of the asset This may prevent terrorists and other foes from being able to remove or disable the tracker tag 12. Preferably, the tracker tag 12 is independently powered and electrically isolated from the asset and does not require manual intervention during normal operation of the tracking system 10. Again, this feature may prevent terrorists and other foes from being able to disable the tracker tag 12. However, in alternate embodiments the tracker tag 12 may interface with the asset and/or a transport vehicle associated with the asset. This interface may be adapted to receive information from asset/transport vehicle sensors and/or to control certain aspects of operation for the asset and/or transport vehicle. For example, the tracker tag 12 may be able to disable or shut down operation of the asset and/or transport vehicle.

As long as the tracker tag 12 has line of sight access to the sky, it selectively receives wireless communications that are continuously broadcast by the GPS satellite constellation 24. The wireless communications include the position and time data continuously broadcast by each of multiple GPS satellites 240 (FIG. 3) that are within line of sight of the tracker tag 12. The tracker tag 12 combines the position and time data from each of the multiple GPS satellite to form combined position and time data. The tracker tag 12 is in communication with the tracking information server 14 via the data communication network 18 and selectively transmits the combined position and time data to the tracking information, server 14. Preferably, with respect to the data communication network 18 and the tracking information server 14, the tracker tag 12 is a thin client using TCP/IP protocol.

The tracker tag 12 determines whether or not to receive the position and time data based on command and control information from the tracking information server 14. Similarly, the tracker tag 12 determines whether or not to transmit the combined position and time data based on command and control information from the tracking information server 14. Additionally, the tracker tag 12 may include one or more on-board sensors and programmed instructions to determine whether or not to receive the position and time. Similarly, the tracker tag 12 may include on-board sensors and programmed instructions to determine whether or not to transmit the combined position and time data. Moreover, the tracker tag 12 may also use one or more asset/transport vehicle sensors in conjunction with the programmed instructions to determine whether or not to transmit the combined position and time data The tracker tag 12 may receive the position and time data and store the combined position and time data for subsequent transmission. When on-board sensors are implemented, the tracker tag 12 may also store sensor data associated with the on-board sensors along with the combined position and time data. The sensor data may also be included in subsequent transmission of the combined position and time data.

The tracker tag 12 may include an algorithm to resolve the position and time data for its own position with respect to the center of the Earth. The algorithm generates XYZ data representing latitude, longitude, and altitude (requiring position and time data from at least four GPS satellites) or XY data representing latitude and longitude (requiring position and time data from at least three GPS satellites) in a trilateration fashion depending on the type of tracking information desired. Time data associated with XYZ or XY data is also generated. The resolution of the resolving algorithm is about 18 inches in latitude (X), about 18 inches in longitude (Y), and about 18 inches in altitude (Z). If the resolving algorithm is implemented in the tracker tag 12, the combined position and time data includes XYZ or XY data and the associated time data. Typically, the resolving algorithm reduces the amount of data transmitted to the tracking information server. The tracker tag 12 may include a data compression process to further reduce the amount of time required for data transmissions. The tracker tag 12 may include encryption and decryption processes for secured communications with the tracking information server 14. As another alternative, the tracker tag 12 may include the encryption process to secure the combined position and time data transmissions. This may prevent terrorists and other foes from using the combined position and time data to locate and/or target the asset.

Communications between the tracker tag 12 and the asset 16 or the transport vehicle associated with the asset are optional and may be by wire or wireless. Communications between the tracker tag 12 and the data communication network 18 are wireless. Communications between the tracking information server 14 and the data communication network 18 are preferably by wire. However, this communication may also be wireless. The data communication network 18 may implement any combination of wireless and wired communication technologies suitable for communications between the tracker tag and the tracking information server 14. The data communication network 18 may be a public network, a private network, or any combination of public and private networks.

For example, the data communication network 18 may include one or more of data communication satellite systems, terrestrial telephone systems, cable television systems, computer networks, and other suitable data communication networks in any combination. The data communication satellite system may include a satellite telephone system or a private satellite network. The satellite telephone system may be any public satellite telephone system, such as the Iridium satellite system the Globalstar satellite system, the Orbcomm satellite system, the Inmarsat satellite system, or any other suitable public satellite telephone system. The terrestrial telephone system may include any combination of land line or wireless telephone systems, such as the public switched telephone network (PSTN), broadband integrated services digital network (ISDN), digital subscriber line (DSL), cellular telephone network, personal communication system (PCS) network, or any other suitable terrestrial telephone network. The computer network may include any combination of wire line local area networks (LANs) and wireless LANs. Preferably, the computer network is Ethernet (i.e., IEEE 802.3 for wire line LAN and IEEE 802.11 for wireless LAN). However, any other suitable network communication protocols may be implemented, such as Bluetooth, token ring, fiber distributed data interface (FDDI), ARCNET, and HiperLAN.

These various communication technologies may be combined in any combination to form a wide area network (WAN) or a metropolitan area network (MAN). Notably, the wireless communication between the tracker tag 12 and the data communication network may be implemented by satellite, cellular telephone, PCS, wireless LAN, or any other suitable wireless technology.

The tracking information server 14 selectively provides command and control information to the tracker tag 12 and receives the combined position and time data from the tracker tag 12. The tracking information server 14 selectively processes the combined position and time data and selectively generates certain tracking information for monitoring movement of the asset 16. The tracking information server 14 selectively makes the tracking information accessible to an authorized user of the monitoring device 22 via the tracking information network 20. The authorized user, for example, may be a subscriber, an employee assigned to monitor the asset, or an operator/administrator associated with the tracking information server 14. The tracking information server 14 may also selectively receive command and control information from an authorized user of the monitoring device 22. Preferably, the tracking information server 14 is compatible with data communications via the data communication network 18 and the tracking information network 20 in TCP/IP protocol.

The tracking information server 14 may include programmed instructions to determine: i) whether or not to provide commands or control information to the tracker tag 12, ii) whether or not to process the combined position and time data, iii) whether or not to generate tracking information and what type of tracking information to generate, iv) whether or not a user is authorized, v) whether or not to make tracking information accessible to an authorized user, and vi) whether or not to receive commands or control information from an authorized user. Other types of programmed instructions are also possible. The programmed instructions may be initially configured, edited, and/or supplemented by an authorized user of the monitoring device 22. Some of the programmed instructions may be initially configured, edited, and/or supplemented, while the tracking system 10 is tracking the asset 16.

The commands may include tracker tag commands to begin receiving position and time data, begin transmitting combined position and time data, stop transmitting combined position and time data, and stop receiving position and time data Commands may also include tracking information server commands to begin processing combined position and time data, to begin generating certain types of tracking information, to stop generating certain types of tracking information, and to stop processing combined position and time data Other types of commands are also possible.

The control information may include a tag profile, a link from the tracker tag to the asset, links from the asset to elements associated with the asset, and link information associated with either the asset or an element of the asset.

Typically, the tag profile is tailored to the type of asset being tracked and the tracking information services contracted for by a subscriber. The tag profile may, for example, specify real-time tracking, tracking on certain detected events, periodic tracking, and/or tracking on command. Additionally, the tag profile may include thresholds associated with detected events, parameters associated with predicting estimated arrival times and/or travel paths, types of tracking information authorized for monitoring, and types of tracking information reports authorized. More specifically, the tag profile may include: i) tracking information to be monitored and frequency, ii) vibration thresholds associated with startup and shutdown, iii) vibration thresholds associated with normal movement, iv) restricted areas, v) hazardous areas, vi) planned course, vii) high stress conditions, viii) fuel and fuel consumption information, and ix) reports to be processed and report frequency. Additional information may also be included in the tag profile.

Typically, the tracker tag 12 includes tracker tag identification data that is embedded with communications to the tracking information server 14. This is how the tracking information server 14 identifies the combined position and time data, particularly when multiple tracker tags 12 are communicating with the tracking information server 14. The link from the tracker tag 12 to the asset 14 allows the tracking information server to associate the combined position and time data with the asset so that the tracking information can reference the asset. For example, the tracker tag identification data may be linked to an aircraft tail number. Similarly, the combined position and time data can also be associated with an element of the asset by the additional link from the asset to the element. For example, an element can be a fuel pump on an aircraft engine. The first link may associate the tracker tag identification data with the aircraft tail number and the second link may associate a fuel pump serial no with the aircraft tail no. Additional examples of elements include operators, crew member, passengers, asset owners, cargo items, operational equipment items, and support equipment items. Other types of elements are also possible. Multiple elements can be identified and linked to a given asset Link information is descriptive information associated with a link For example, i) asset identification data, ii) asset certification, iii) asset operational information, iv) asset maintenance information, v) element identification data, vi) element certification, vii) element operational information, and viii) element maintenance information. Other types of link information are also possible.

The programmed instructions in either the tracking information server 14 or the tracker tag 12 may include any combination of the various types of control information. Likewise, the commands are typically included in the programmed instructions so that, as certain events are detected or as certain sequences occur, the commands can be communicated automatically.

The tracking information server 14 may include the algorithm to resolve position and time data for the tracker tag 12 from raw GPS position and time data included in the combined position and time data The resolving algorithm generates XYZ data representing latitude, longitude, and altitude (requiring position and time data from at least four GPS satellites) or XY data representing latitude and longitude (requiring position and time data from at least three GPS satellites) in the same manner as described above for the resolving algorithm in the tracker tag 12. This permits resolution of the XYZ data in either the tracker tag 12 or the tracking information server 14 depending on the preferences of the user and/or tracking information service provider. The algorithm also generates time data associated with XYZ or XY data. If the resolution algorithm is performed by the tracker tag 12, it is unnecessary to perform it again in the tracking information server 14. Conversely, if the resolution algorithm is not performed by the tracker tag 12, the tracking information server 14 must resolve the XYZ data. The tracking information server 14 may include a data decompression process to decompress compressed combined position and time data transmissions. The tracking information server 14 may include encryption and decryption processes for secured communications with the tracker tag 12. As another alternative, the tracking information server 14 may include the decryption process to decrypt secure combined position and time data transmissions.

The tracking information network 20 may implement any combination of wireless and wired communication technologies suitable for communications between the tracking information server 14 and the monitoring device 22. Preferably, communications between the tracking information network 20 and the tracking information server 14 and between the tracking information network 20 and the monitoring device 22 are both by wire. However, either of these communications may wireless or both may be wireless. Like the data communication network 18, the tracking information network 20 may be a public network, a private network, or any combination of public and private networks. As such, the networks identified above for the data communication network 18 may also be implemented in the tracking information network 20. Notably, the tracking information network 20 may include the Internet, which is accessible through each of the major communication systems identified above. The tracking information network 20 and the data communication network 18 may be linked together forming a common tracking system network.

The monitoring device 22 is any type of device suitable for communicating with the tracking information server 14 and displaying the tracking information. For example, a personal computer, a notebook computer, a personal digital assistance, a wireless personal digital assistance, a cellular telephone, a satellite telephone, a pager, or any other suitable display device. Preferably, the tracking information server 18 provides tracking information via a Web server connected to the Internet with suitable security measures. Accordingly, the monitoring device 22 preferably has access to the Internet for receiving the tracking information and monitoring movement of the asset. However, the public Internet is not required for communications between the monitoring device 22 and the tracking information server 14. Other alternatives include communications through a private network or one-to-one dial-up-type connections through a public network.

The optional communication path between the tracker tag 12 and the asset 16 or the transport vehicle associated with the asset 16 may be implemented via any suitable wire line or wireless communication technology. For example, the tracker tag 12 may include an interface to any type of suitable communication network or communication port associated with the asset 16 or the transport vehicle. For example, the communication network or communication port may implement various types of serial or parallel buses (e.g., controller area network (CAN) bus, universal serial bus (USB), etc.), Ethernet (e.g., IEEE 802.3 (wire line), IEEE 802.11 (wireless), etc.), or Bluetooth technologies.

While FIG. 1 depicts a tracking system 10 with one tracker tag 12 and one monitoring device 22, the system can be expanded to include multiple tracker tags and/or multiple monitoring devices. Use of multiple tracker tags allows a user to monitor multiple assets, such as a fleet of aircraft or all airborne aircraft. Use of multiple monitoring devices allows multiple users to monitor an asset. For example, a cargo aircraft can be monitored by various users associated with the cargo, as well as users associated with aircraft owner, the aircraft fuel pump manufacturer, the transport company, and government regulatory agencies. Of course use of both multiple tracker tags and multiple monitoring devices provides a combination of additional scenarios.

Preferably, the tracking information server 14 is housed in a single facility. However, it may be distributed among multiple facilities and networked together. Preferably, the tracking information server 14 is a ground-based system. However, other types of platforms are possible, such as an airborne platform or a ship-based platform.

Figure 2:
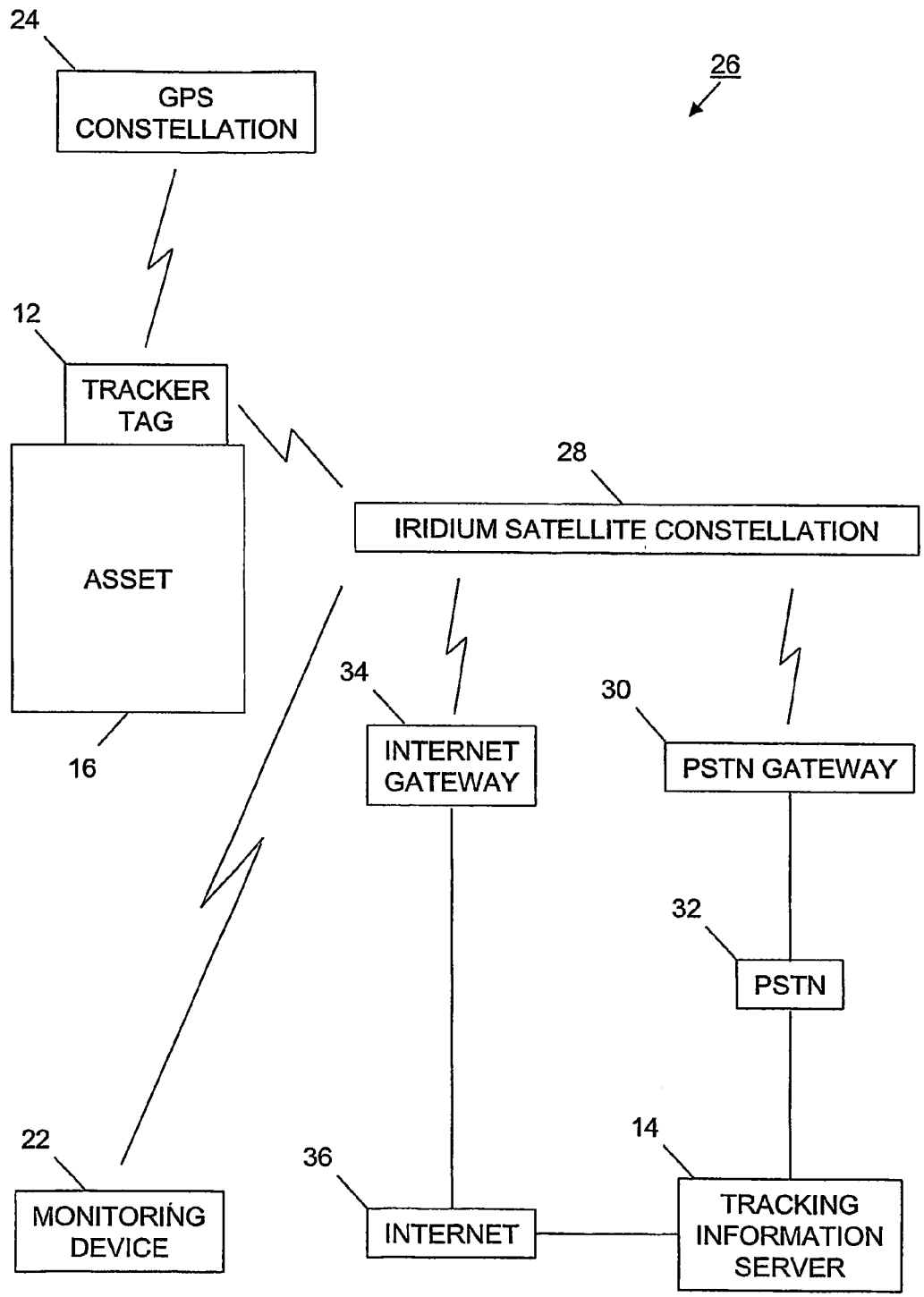
FIG. 2 is a block diagram of an embodiment of a global tracking system incorporating the invention.

With reference to FIG. 2, an embodiment of a global tracking system 26 includes the tracker tag 12, the tracking information server 14, the asset 16, the monitoring device 22, the GPS satellite constellation 24, an Iridium satellite constellation 28, an Iridium satellite/PSTN gateway 30, a PSTN 32, an Iridium satellite (Internet gateway 34, and an Internet 36. The tracker tag 12, tracking information server 14, asset 16, monitoring device 22, and GPS satellite constellation 24 are as described above in reference to FIG. 1.

A global implementation of the tracking system 26 is provided by a data communication network 18 (FIG. 1) and a tracking information network 20 (FIG. 1) that provide global coverage (i.e., worldwide communications). The data communication network 18 (FIG. 1) is provided by a satellite telephone system and a terrestrial telephone network. As shown, the preferred satellite telephone system is the Iridium telephone system. However, other satellite telephone systems that provide global coverage may also be implemented in the global tracking system 26. The preferred terrestrial telephone network is the PSTN. However, other types of terrestrial telephone networks maybe implemented. More specifically, the data communication network 18 (FIG. 1) is provided by the Iridium satellite constellation 28, the Iridium satellite/PSTN gateway 30, and the PSTN 32.

In the embodiment being described, the tracking information network 20 (FIG. 1) is provided by a satellite telephone system and the Internet 36. As shown, the preferred satellite telephone system is the Iridium telephone system. However, other satellite telephone systems that provide global coverage may also be implemented in the global tracking system 26. More specifically, the tracking information network 20 (FIG. 1) is provided by the Iridium satellite constellation 28, the Iridium satellite/Internet gateway 34, and the Internet 36.

Global coverage of the tracker tag 12 secured to the asset is provided by the Iridium satellite system. Likewise, global access to the tracking information by a subscriber/client user at the monitoring device is provided by the Iridium satellite system. In an additional embodiment of a global tracking system, if global access is not required, the tracking information network 20 (FIG. 1) may implement other communication networks that provide regional or local access to the tracking information server 14 while the data communication network 18 provides global coverage. Conversely, in an another embodiment of a global tracking system, if global tracking is not required, the data communication network 18 (FIG. 1) may implement other communication networks that provide regional or local tracking of the asset while the tracking information network 20 provides global coverage.

With reference to FIG. 3, the GPS satellite constellation 24 includes multiple GPS satellites 240 orbiting Earth 37.

Figure 4:
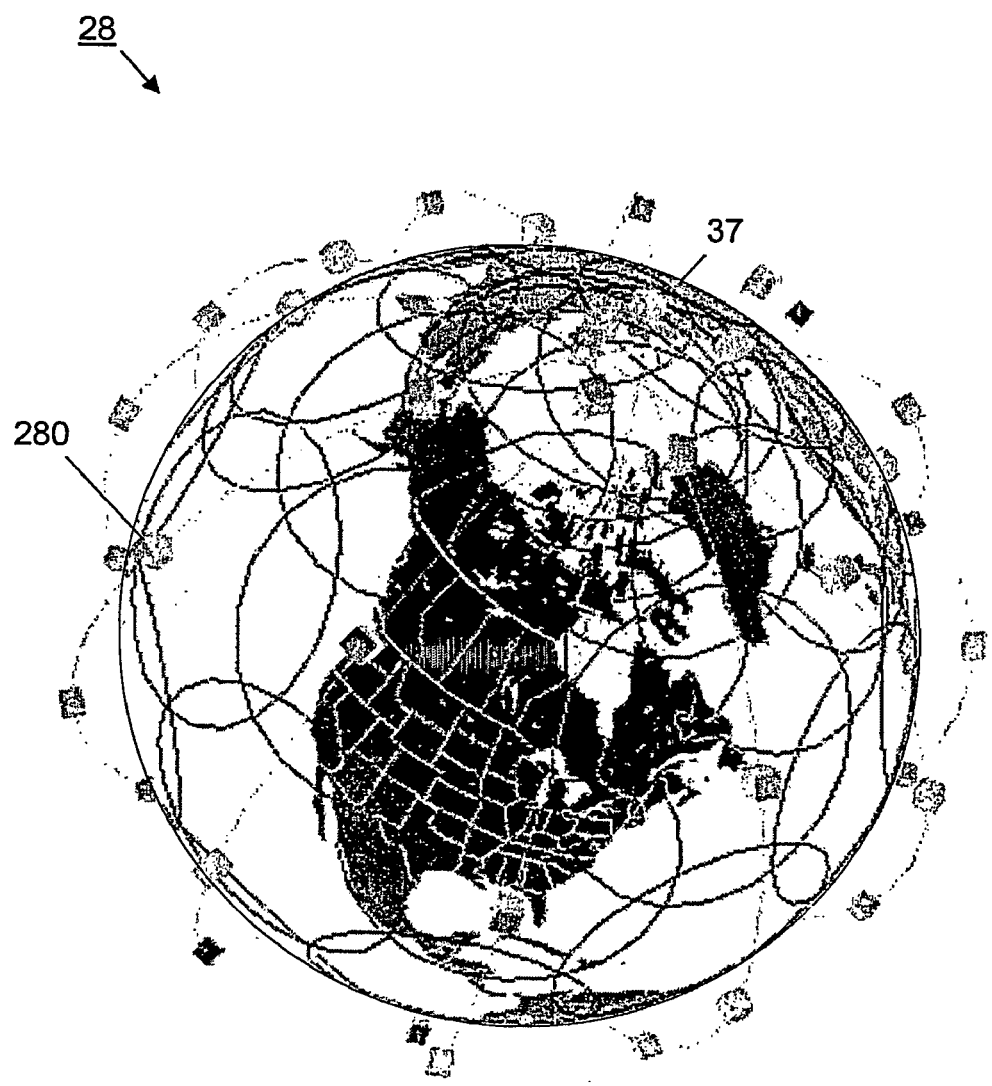
FIG. 4 depicts an Iridium satellite constellation with multiple satellites in Earth orbit.

With reference to FIG. 4, the Iridium satellite constellation 28 includes 66 Iridium satellites 280 orbiting Earth 37 in low Earth orbit (LEO) at an average altitude of 420 miles (670 km). The Iridium satellites 280 lie in six (6) orbital planes, with eleven (11) satellites per orbital plane. Within the Iridium satellite system, the Iridium satellites 280 communicate with Iridium telephones (i.e., radio transceivers or two-way radios) and gateways to terrestrial land line and wireless telephone systems, as well as gateways to the Internet Notably, with the Internet gateway, the Iridium satellite system is an Internet service provider (ISP). Worldwide voice, data, and Internet services over the Iridium satellite system are provided by Iridium Satellite LLC.

Figure 5:
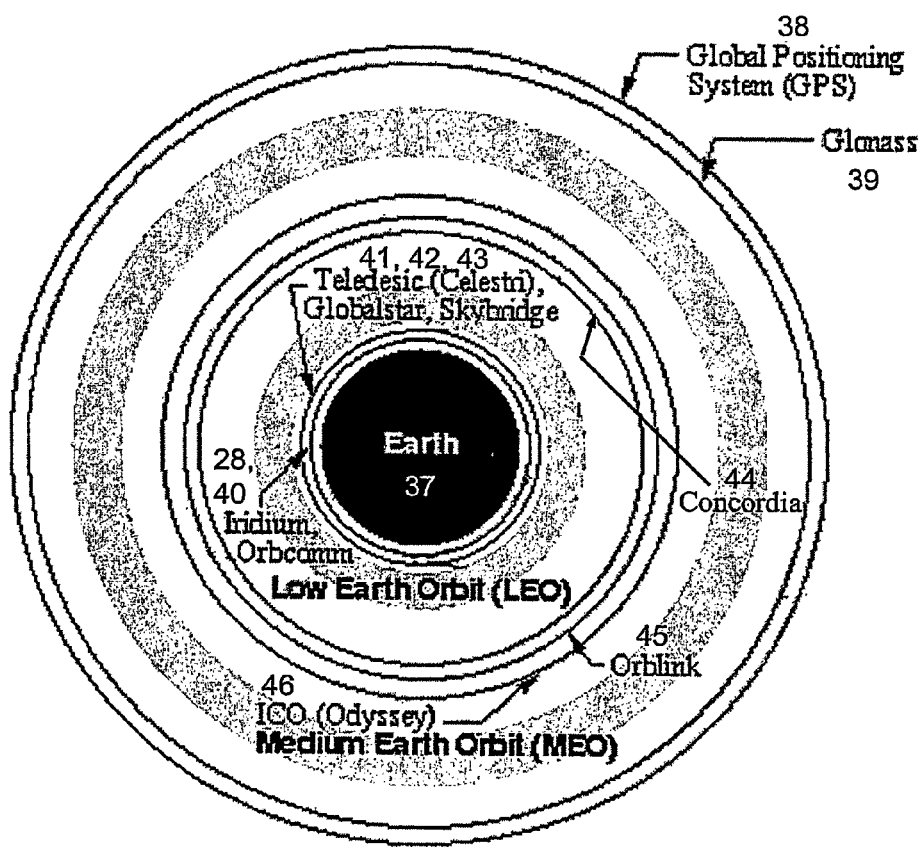
FIG. 5 illustrates orbital altitudes of various satellite constellations.

With reference to FIG. 5, the altitude of exemplary data communication satellite constellation orbits are illustrated. The Iridium satellite constellation 28, an Orbcomm satellite constellation 40, a Teledesic satellite constellation 41, a Globalstar satellite constellation 42, and a Skybridge satellite constellation 43 orbit Earth 37 at LOE. A Concordia satellite constellation 44, an Orblink satellite constellation 45, and an ICO satellite constellation orbit at a medium Earth orbit (MEO). A NAVSTAR GPS satellite constellation 38 and a Glonass satellite constellation 39 orbit Earth at a higher altitude.

FIG. 5 illustrates various orbital altitudes for satellite constellations that may be used in conjunction with concepts of the present patent application. By use of one or more of these satellite systems, the intended operations are obtained as discussed herein.

Figure 6:
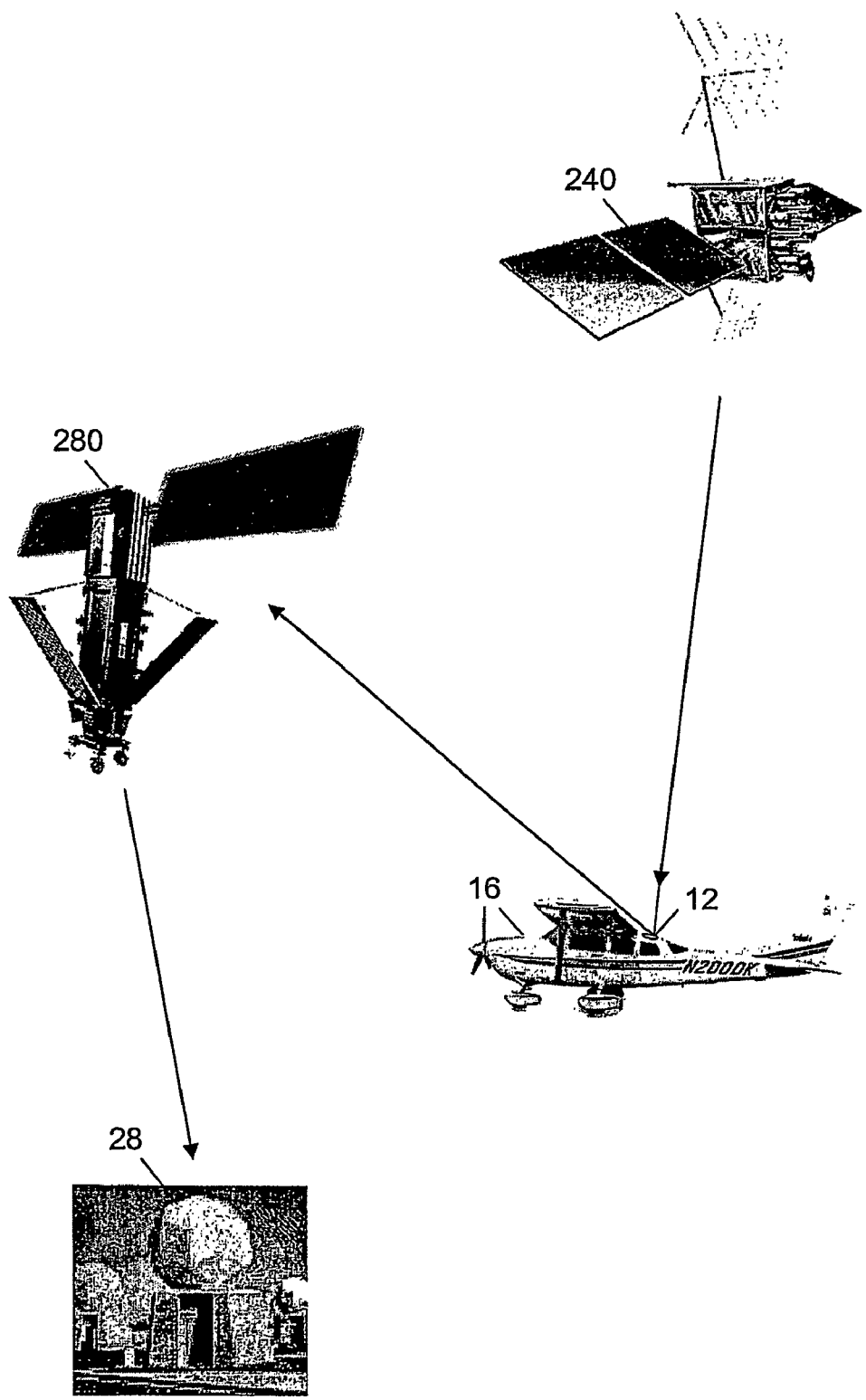
FIG. 6 shows the flow of GPS data in a satellite communication portion of an embodiment of a tracking system.

With reference to FIG. 6, in one embodiment of the tracking system 10, GPS data flows from the GPS satellite 240 to the tracker tag 12 on the asset 16 (e.g., a general aviation aircraft). Data transmissions from the tracker tag are relayed by the Iridium satellite 280 to the Iridium satellite/PSTN gateway 28.

FIG. 6 particularly notes that the tracker tag sends data to an Iridium satellite which in turn sends this information to a ground station, and further use is shown of GPS satellites providing information to the tracker tag.

Figure 7:
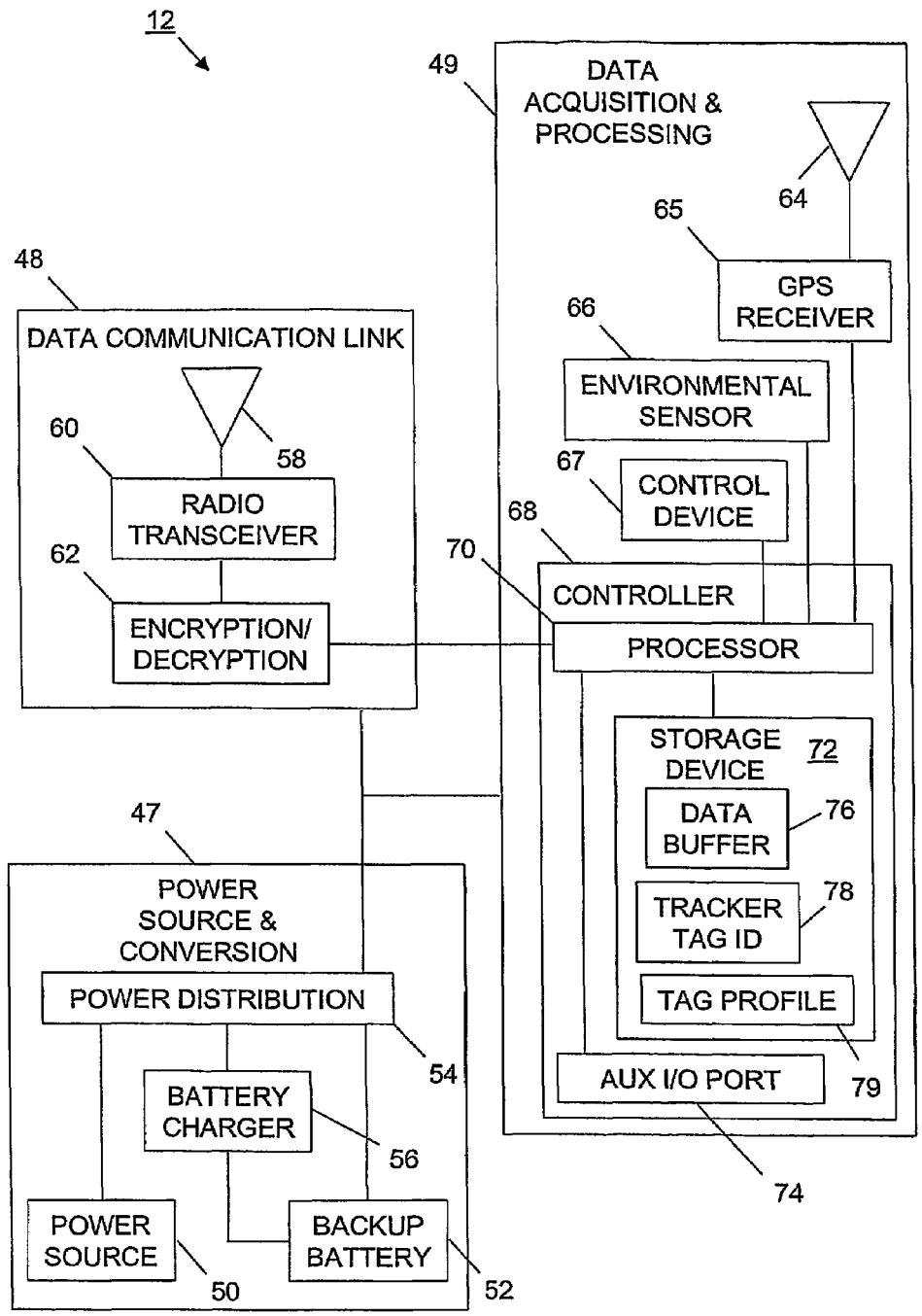
FIG. 7 is a block diagram of an embodiment of a tracker tag.

With reference to FIG. 7, an embodiment of the tracker tag 12 includes a power source and conversion module 47, a data communication link 48, and a data acquisition and processing module 49. The power source and conversion module 47 provides electrical power to the data communication link 48 and the data acquisition and processing module 49. This permits the tracker tag 12 to operate independent of external power sources. The data acquisition and processing module 49 selectively receives position and time data from GPS satellites 240 (FIG. 3) within line of site of the tracker tag 12 and combines the raw GPS position and time data to form combined position and time data and selectively stores the combined position and time data. The data acquisition and processing module 49 selectively communicates the combined position and time data to the data communication link 48. The data communication link 48 selectively transmits the combined position and time data to the tracking information server 14 (FIG. 1) via the data communication network 18 (FIG. 1). The data communication link 48 also receives command and control information from the tracking information server 14 (FIG. 1).

In the embodiment being described, the power source and conversion module 47 includes a power source 50, a backup battery 52, a power distribution module 54, and a battery charger 56. The power source 50 provides power to the power distribution module 54. The power source 50 may include any combination of a piezoelectric power generator, a solar collector panel 86 (FIG. 8), and a primary battery, as well as other types of suitable power sources. The power distribution module 54 conditions the power so that suitable power is provided to the various components of the tracker tag 12. The power distribution module 54 distributes power to the battery charger 56, data communication link 48, and data acquisition and processing module 49. The battery charger 56 selectively applies charge current to the backup battery 52. For example, when power from the power source is low, the battery charger 56 may not apply the charge current. The backup battery 52 selectively provides power to the power distribution module 54. For example, when power from the power source is suitable, the backup battery 52 may not provide power to the power distribution module 54.

In the embodiment being described, the data communication link 48 includes an RF antenna 58, a radio transceiver 60, and an encryption/decryption process 62. The radio transceiver 60 and RF antenna 58 selectively transit the combined position and time data to the tracking information server 14 (FIG. 1) via data communication network 18 (FIG. 1). The RF antenna 58 and radio transceiver 60 also receive command and control information from the tracking information server 14 (FIG. 1). The encryption/decryption process 62 is optional and may encrypt and/or decrypt any type of communication transmitted or received by the tracker tag 12. The encryption/decryption process 62 may encrypt all communications to the tracking information server 14 and decrypt all communications from the tracking information server 14. Alternatively, the encryption/decryption process 62 may be limited to encrypt the combined position and time data transmitted to the tracking information server 14.

In the embodiment being described, the data acquisition and processing module 49 includes a GPS antenna 64, a GPS receiver 65, an environmental sensor 66, a control device 67, and a controller 68. The GPS antenna 64 and GPS receiver 65 selectively receive position and time data from GPS satellites 240 (FIG. 3) within line of site of the tracker tag 12. The controller 68 combines the raw GPS position and time data to form the combined position and time data and selectively stores the combined position and time data. The controller 68 selectively communicates the combined position and time data to the data communication link 48.

The environmental sensor 66 is optional. If implemented, the environmental sensor 66 may include one or more accelerometers. If the environmental sensor 66 includes, for example, an accelerometer, the environmental sensor 66 senses vibration and provides vibration measurements to the controller 68. The controller compares the vibration measurements with predetermined thresholds to detect various types of events. For example, using the vibration measurements, the controller can detect i) startup of a power plant associated with the asset 16 (FIG. 1), ii) shutdown of the power plant, iii) start of movement of the asset, iv) cessation of movement of the asset, v) excessive increase in acceleration of the asset, and vi) excessive decrease in acceleration of the asset. Typically, the controller 68 selectively stores detected event data along with associated combined position and time data and may include detected event data in subsequent transmission of the combined position and time data The environmental sensor 66 may also sense other types of environmental conditions. For example, the environmental sensor may also include one or more temperature sensors, one or more strain gauges, and one or more other type of environmental sensor to sense, for example, voltages, pressures, electric fields (e-fields), and other quantifiable parameters. The environmental sensor 66 represents any combination of one or more of any type of sensor.

Any sensor can be used by the controller 68 to detect an event and subsequently change operation of the tracker tag 12. Similarly, the controller 68 can use the position and time data from the GPS satellites 240 to detect events associated with time and/or location and subsequently change tracker tag operation. Moreover, when combined position and time data is transmitted to the tracking information server 14 (FIG. 1) it may also include sensor data from any sensors associated with the tracker tag 12, particularly detected event data associated with the sensor data or the position and time data.

The controller 68 may use a detected event to determine whether or not the tracker tag 12 should begin receiving the position and time data, begin storing the combined position and time data, and begin transmitting the combined position and time data. For example, the controller 68 can cause the tracker tag 12 to begin receiving position and time data and begin storing combined position and time data when the aircraft takes off, begin transmitting combined position and time data when the aircraft begins to move, stop transmitting after a predetermined period of time, begin transmitting again when the aircraft experiences turbulence, stop transmitting again after a predetermined period of time, stop receiving position and time data when the aircraft stops moving, begin transmitting again when the aircraft stops moving, and stop transmitting when all the stored combined position and time data is transmitted.

The control device 67 is optional and provides for manual startup and shutdown of the tracker tag 12. The control device 67 can be any type of switch or control suitable for its intended purpose. The control device 67 is in communication with the controller 68 and the power source and conversion module 47. Upon a startup activation of the control device 67, the power source 50 is enabled and the controller 68 begins an orderly power up sequence. Upon a shutdown activation, the controller 68 begins an orderly shutdown sequence and, at a suitable time, disables the power source 50.

In the embodiment being described, the controller 68 includes a processor 70, a storage device 72, and an auxiliary input/output (I/O) port 74. The processor 70 is in communication with the GPS receiver 65, environmental sensor 66, control device 67, storage device 72, auxiliary I/O port 74, and data communication link 48. The storage device 72 includes a data buffer 76, a tracker tag identification data 78, and a tag profile 79. The processor 70 receives position and time data from the GPS receiver 65. The processor 70 combines the raw GPS position and time data to form the combined position and time data and selectively stores the combined position and time data in the data buffer 76. The processor 70 selectively communicates the combined position and time data from the data buffer 76 to the data communication link 48.

The processor 70 may include the resolving algorithm described above in reference to FIG. 1. When using the resolving algorithm, the processor 70 may temporarily store the combined position and time data while generating the XYZ or XY data and associated time data. Once the XYZ or XY data and associated time data is generated it is stored in the data buffer 76 and the corresponding raw GPS position and time data is purged. The combined position and time data communicated to the data communication link 48 includes the XYZ or XY data and associated time data instead of the raw GPS position and time data.

If the environmental sensor 66 is implemented, the processor 70 detects the events associated with vibration measurements by the vibration sensor described above and/or other types of measurements by the various other types of sensors (i.e., temperature, strain, voltage, pressure, e-field). The processor 70 may use the XYZ or XY data to detect additional events related to the position of the asset. The processor 70 compares the XYZ or XY data to predetermined XYZ or XY coordinate limits to detect certain events. For example, the processor 70 may detect when the asset is i) in the proximity of a restricted area, ii) in a restricted area, iii) in the proximity of a hazardous area, iv) in a hazardous area, v) at a way point, vi) at a destination, vii) off course, viii) nearing a high stress condition, ix) experiencing a high stress condition, x) experiencing excessive loss of altitude, xi) experiencing excessive increase in altitude, xii) experiencing unexpected stoppage or significant slow down, or xiii) exceeding a speed restriction. Additional types of detected events are also possible.

Typically, the processor 70 selectively stores detected event data along with associated combined position and time data Like detected events associated with vibration, the processor 70 may use any of the detected events associated with position and time to determine whether or not the tracker tag 12 should begin receiving the position and time data, storing the combined position and time data, and transmitting the combined position and time data. Additionally, any type of detected event can be included in the tracking information provided to the subscriber/client user at the monitoring device 22 (FIG. 1).

The processor 70 receives command and control information from the data communication link 48. In one embodiment, the processor 70 receives command and control information by logging in to a messaging system (e.g., an e-mail system such as a point-of-presence 3 (POP3) e-mail server, a text messaging system, etc.) and retrieving a message to an address associated with the tracker tag 12. In this embodiment, the command and control information is included in a message from the tracking information server 14 (FIG. 1). The message having been created by an authorized user of the monitoring device 22 (FIG. 1). The messaging system may be within the tracking information server 14 (FIG. 1) or through an independent e-mail service provider. The information stored in the tag profile 79 may be predetermined and may be provided in control information. Alternatively, the tag profile 79 may be predetermined and permanently resident in the storage device 72. In another alternative, the tag profile 70, or certain information within the tag profile 70, may be configured and/or edited during operation of the tracker tag 12.

The processor 70 manages data transmissions to the tracking information server 14 (FIG. 1) by controlling when the combined position and time data is communicated from the data buffer 76 to the data communication link 48. Typically, the processor 70 controls data transmissions in a burst fashion by waiting for a group of the combined position and time data to accumulate in the data buffer 76. This may be based on commands, control information, and/or the tag profile 79. The processor 70 encodes each transmission burst with tracker tag identification data 78 so that the tracking information server 14 can associate the data transmitted with the appropriate tracker tag 12. Event data is typically stored in the data buffer 76. A transmission burst may also include event data associated with the combined position and time data contained in the burst.

In one embodiment, the processor controls the timing between transmission bursts to maintain a virtual private network (VPN) connection over a public data communication system within the data communication network 18 (FIG. 1). For example, the public data communication system may be the Iridium satellite system, a similar satellite system, or any type of wireless telephone system that provides for VPNs. The processor 70 may control the timing between transmission bursts so that the tracking system 10 (FIG. 1) can provide real-time tracking information. Alternatively, the processor 70 may control the timing to minimize transmission time over the data communication network. Thus, minimizing communication costs for public telephone networks or other carriers that charge for connect time. As another alternative, the processor 70 may delay transmission bursts until a begin transmitting command is received via the data communication network. Typically, the processor 70 maintains the combined position and time data in the data buffer associated with each transmission burst until an acknowledgment of receipt of the transmission burst is received via the data communication network 18 (FIG. 1).

The auxiliary I/O port 74 is optional and provides a port for directly connecting a computer device to the tracker tag 12. The computer device, for example, can be used to perform tracker tag maintenance or to download combined position and time data from the data buffer 76. The computer device may be a personal computer, a notebook computer, a personal digital assistance, or a similar device.

Figure 8:
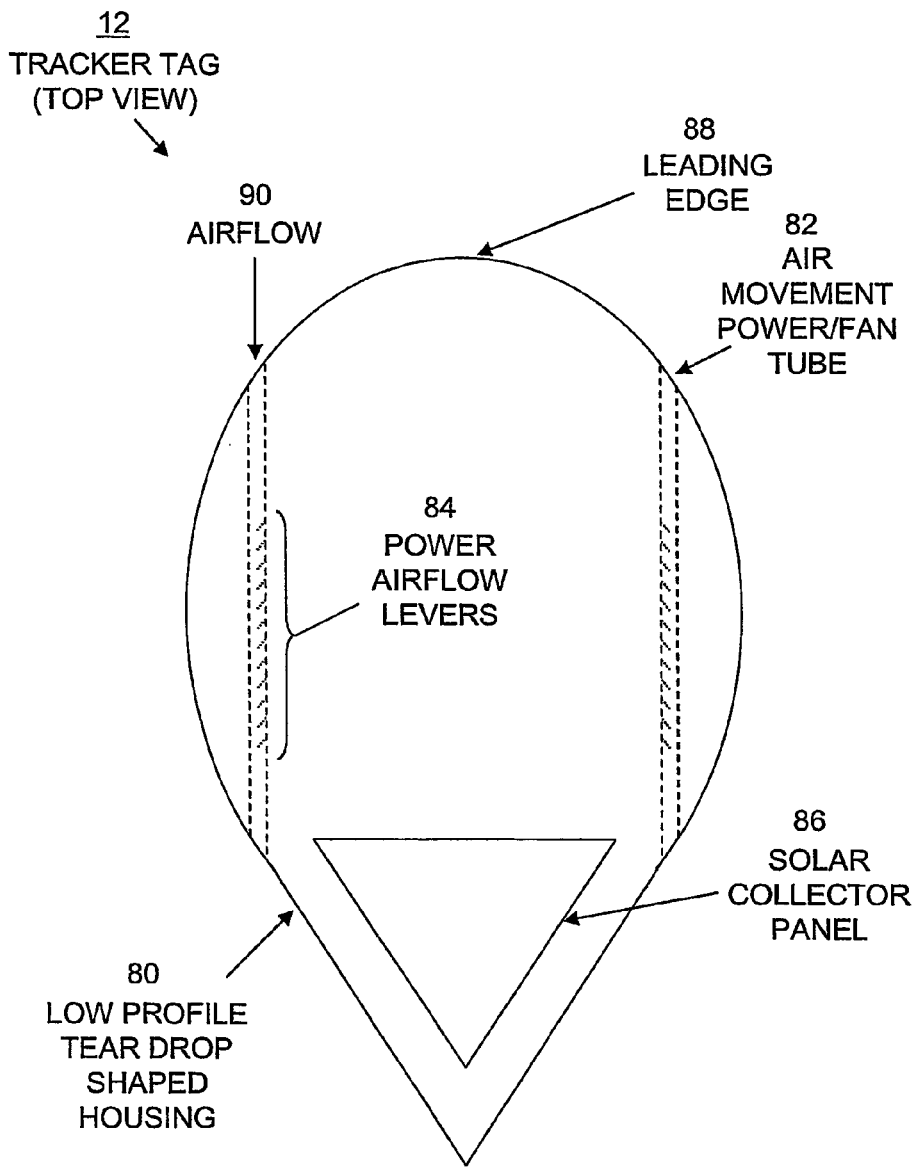
FIGS. 8–10 provide top and side views of an embodiment of a tracker tag.
Figure 9:
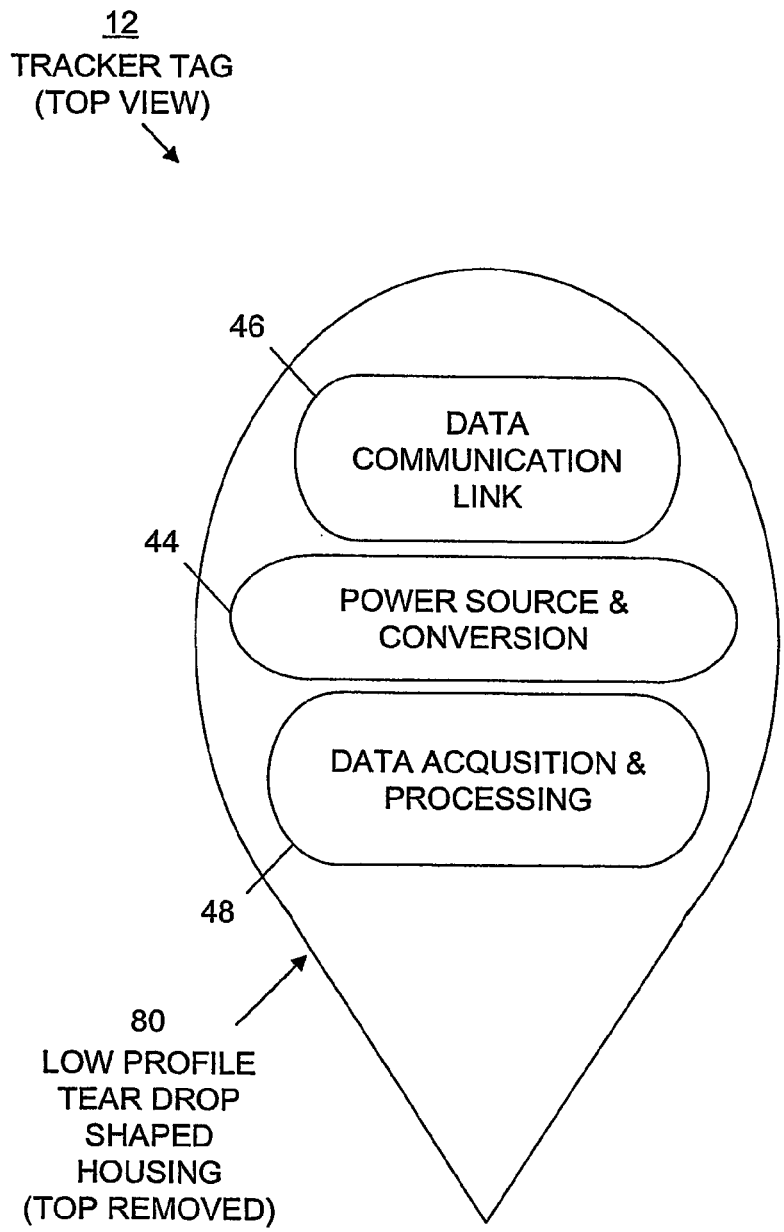
Figure 10:
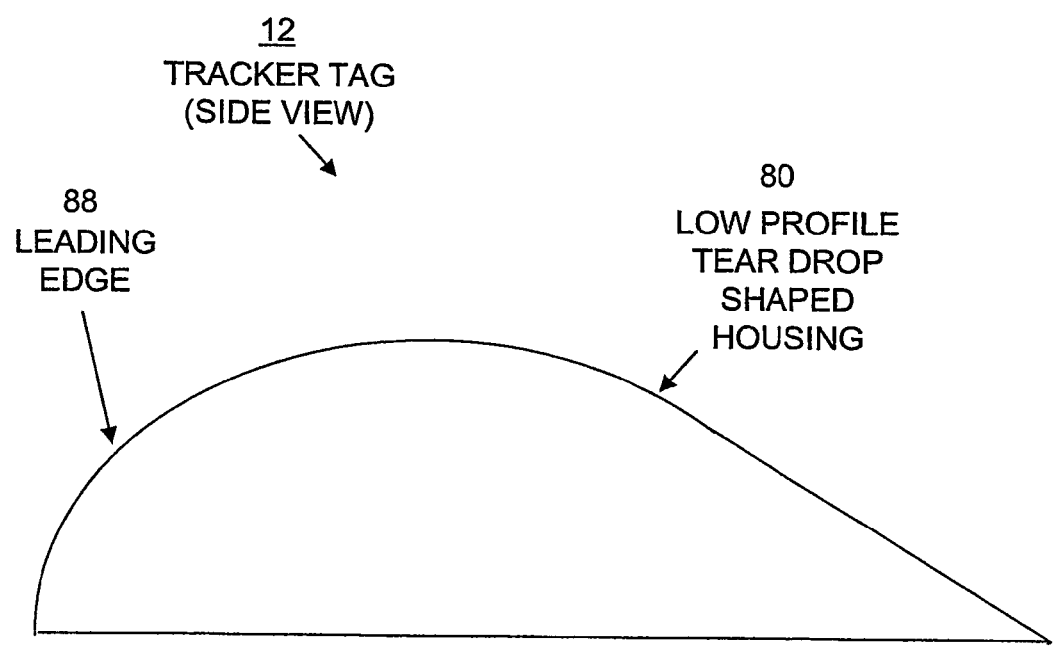

With reference to FIG. 8–10, one embodiment of the tracker tag 12 has a teardrop-shaped housing 80. Two air movement power/fan tubes 82 with power airflow levers 84 inside a portion of the tubes are provided in the housing 80. A solar collector panel 86 is secured to the top of the housing 80. The power airflow levers 84 and the solar collector panel 86 generate power and act as supplemental power sources 50 (FIG. 7). Airflow 90 perpendicular to the leading edge 88 of the tracker tag 12 activates the power airflow levers 84 to generate electrical power. The solar collector panel 86 generates electrical power from light.

With reference to FIG. 9, for the embodiment being described, the power source and conversion module 47, data communication link 48, and data acquisition and processing module 49 are shown with the top of the housing 80 removed.

In FIGS. 8 and 9, illustrated is one embodiment of a tracker tag according to the concepts of the invention. As previously noted, since this tracker tag is entirely independent from the power source of the aircraft, ground vehicle or watercraft, various power generating mechanisms are provided unto the tracker tag itself. For example, tracker tag 12 will include airflow technology having an air movement power/fan tube 82 and power air flow levers 84. As air flow 90 enters the tube, electrical power is generated. For additional power source, a solar collector panel 86 is also provided on the tracker tag. A backup battery 52 (FIG. 7) is interconnected with the power source and conversion module 47 (FIG. 7) within the tracker tag 12 to insure a constant operation of the tracker tag. The battery may be selectively recharged by one of the alterative power sources. To provide the communication from the tracker tag on the aircraft, ground vehicle or watercraft to a tracking information server 14 (FIG. 1) or other appropriate location such as through the Internet, the tracking system also includes a multidirectional transmission and reception antenna and a radio-GPS receiver and RF two-way radio system package. It is also noted that this embodiment forms the tracker tag 12 with a low profile tear-shaped design in order to cut down on wind resistance.

With reference to FIG. 10, for the embodiment being described, the aerodynamic nature of the teardrop-shaped housing 80 is shown in a side view. As shown, the leading edge 88 is on the left.

FIG. 10 illustrates the side profile of the tracker tag 12 placed on the fuselage. A larger overall picture showing the mounting of tracker tag 12 on an aircraft is also illustrated in FIG. 6. As can be noted from these figures, the tracker tag 12 may be physically and electrically isolated from the internal systems of the aircraft This insures independence of the tracker tag at all times.

It is further noted that, while the tracker tag is shown in this embodiment in a low profile tear-drop shape, other aerodynamic designs may also be appropriate. Further, while the power generation has been illustrated as an air mount power fan tube and the solar collector panel, as well as the backup battery, it is to be appreciated that other forms of energy generation mechanisms may also be implemented. For example, but not limiting the discussion, one may also use gel cells, fuel cells, hydrogen cells, turbine technology, fly wheel technology and still other power generation arrangements in order to insure the reliable operation of the tracker tag 12. Additionally, the tracker tag 12 may be attached to a ground vehicle or a watercraft.

Figure 11:
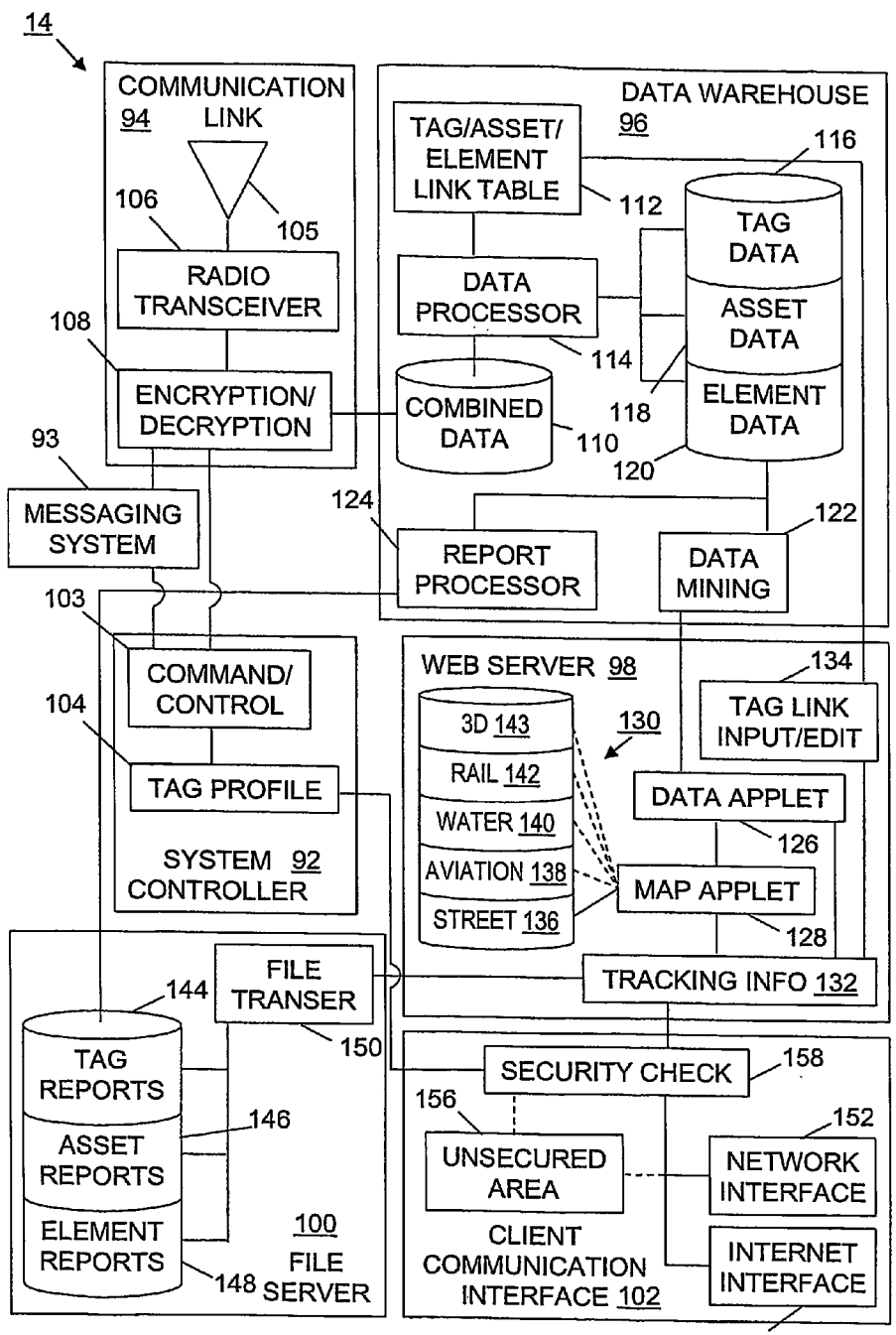
FIG. 11 is a block diagram of an embodiment of a tracking information server.

With reference to FIG. 11, an embodiment of the tracking information server 14 includes a system controller 92, a messaging system 93, a communication link 94, a data warehouse 96, a Web server 98, a file server 100, and a client communication interface 102. The communication link 94 selectively provides command and control information to the tracker tag 12 (FIG. 1) and receives the combined position and time data from the tracker tag 12. The data warehouse 96 selectively processes the combined position and time data to form tag data, asset data, and/or element data The messaging system 93 is optional and may include at least one or more of an e-mail messaging system, a text messaging system, and a paging system.

The Web server 98 includes a set of Web pages for displaying tracking information. The Web server 98, in conjunction with the data warehouse 96 mining the tag data, asset data, and/or element data, selectively populates one or more of the Web pages with certain tracking information for monitoring movement of the asset 16 (FIG. 1). The Web server 98, in conjunction with the client communication interface 102, selectively makes the tracking information accessible to an authorized user of the monitoring device 22 (FIG. 1) via the tracking information network 20 (FIG. 1).

The data warehouse 96 may also process the tag data, asset data, and/or element data into tag reports, asset reports, and/or element reports. If report processing is implemented, the tag reports, asset reports, and/or element reports are stored on the file server 100. The Web server 98, in conjunction with the file server 100 and the client communication interface 102, selectively makes the tag reports, asset reports, and/or element reports accessible to an authorized user of the monitoring device 22 (FIG. 1) via the tracking information network 20 (FIG. 1).

The Web server 98, in conjunction with the client communication interface 102, may selectively receive links between tracker tag identification data and assets, as well as associated link information, from an authorized user of the monitoring device 22 (FIG. 1). Likewise, the Web server 98 may selectively receive links between an asset and elements associated with the asset, as well as associated link information, from an authorized user. The data warehouse 96 stores the links and link information collected by the Web server 98 for use during generation of asset data and element data.

The system controller 92 provides overall control of the tracking information server 14 and, in conjunction with the communication link 94, control of the tracker tag 12. Overall control may be based on programmed instructions in the tag profile. The programmed instructions in the tag profile are stored in the system controller 92. The programmed instructions include command and control information. The tag profile includes control information, as described above. The system controller 92, in conjunction with the client communication interface 102, may selectively receive command and control information from an authorized user of the monitoring device 22 (FIG. 1) to configure and/or edit the programmed instructions and/or the tag profile.

In the embodiment being described, the system controller 92 includes a command and control module 103 and a tag profile 104. The command and control module 103 processes programmed instructions for overall control of the tracking information server 14 and, in conjunction with the communication link 94 and the data communication network 18 (FIG. 1), control of the tracker tag 12 (FIG. 1) by communicating command and control information. Certain parts of overall control may be based on the tag profile 104. The information stored in the tag profile 104 may be predetermined and may be provided in control information. Alternatively, the tag profile 104 may be predetermined and permanently resident. In another alternative, the tag profile 104, or certain information within the tag profile 104, may be configured and/or edited during operation of the tracking information server 14 and associated tracker tag 12 (FIG. 1).

The command/control module 103 may package the command and control information into programmed instructions for the tag profile, including command and control information provided by an authorized user of the monitoring device 22 (FIG. 1), as an e-mail message to an e-mail address associated with the tracker tag 12 (FIG. 1) and communicated via the messaging system 93 (e.g., e-mail system, text messaging system,etc.). The message maybe stored in the messaging system 93 within the tracking information server 14 for retrieval by the tracker tag 12 (FIG. 1). Alternatively, the message may be communicated to an independent message service provider (e.g., an e-mail service provider, a text messaging service provider, etc.) for retrieval by the tracker tag 12 (FIG. 1) from the message service provider.

In the embodiment being described, the communication link 94 includes an RF antenna 105, a radio transceiver 106, and an encryption/decryption process 108. The RF antenna 105 and radio transceiver 106 selectively receive the combined position and time data from the tracker tag 12 (FIG. 1) via data communication network 18 (FIG. 1). The radio transceiver 106 and RF antenna 105 also transmit command and control information to the tracker tag 12 (FIG. 1). The encryption/decryption process 108 is optional and may encrypt and/or decrypt any type of communication transmitted or received by the tracking information server 14. The encryption/decryption process 108 may encrypt all communications to the tracker tag 12 and decrypt all communications from the tracker tag 12. Alternatively, the encryption/decryption process 108 may be limited to decrypt the combined position and time data received from the tracker tag 12.

In the embodiment being described, the data warehouse 96 includes a combined position and time storage area 110, a tag/asset/element link table 112, a data processor 114, a tag data storage area 116, an asset data storage area 118, an element data storage area 120, a data mining process 122, and a report processor 124. The combined position and time storage area 110 receives the combined position and time data from the tracker tag (FIG. 1) via the communication link 94.

The tag/asset/link table 112 stores the links and link information collected by the Web server 98. The link from the tracker tag 12 to the asset 14 allows the data processor 114 to associate the combined position and time data with the asset so that asset data may be generated. Similarly, the link from the asset 14 to an element of the asset allows the data processor 114 to associate the combined position and time data with the element so that element data may be generated. Link information is descriptive information that maybe associated with an asset or an element. The link information is accessible to the report processor during generation of the asset and element data.

The data processor 114 may include a data decompression process to decompress compressed combined position and time data transmissions. If the combined position and time data does not include XYZ or XY data, the tracking information server 14 includes the algorithm to resolve position and time data for the associated tracker tag 12 from raw GPS position and time data described above in reference to FIG. 1. The algorithm generates XYZ data representing latitude, longitude, and altitude (requiring position and time data from at least four GPS satellites) or XY data representing latitude and longitude (requiring position and time data from at least three GPS satellites) in the same manner as described above if the resolving algorithm is performed in the tracker tag 12. The algorithm also generates time data associated with XYZ or XY data.

Whether or not the data processor 114 calculates the XYZ or XY data, the data processor 114 may use the XYZ or XY data to detect events related to the position of the asset The data processor 114 compares the XYZ or XY data to predetermined XYZ or XY coordinate limits to detect certain events. The types of events that can be detected by the data processor 114 based on position include the same examples listed above for the tracker tag 12. Of course, additional types of detected events are also possible. Typically, the detected events are communicated to the system controller 92 so that the system controller 92 can communicate suitable commands in response to the detected event. Typically, the data processor 114 selectively stores detected event data along with associated combined position and time data.

The data processor 114 selectively processes the combined position and time data, detected event data, and link information based on control information from the controller (i.e., programmed instructions in the tag profile 104), links from the tag/asset/element link table, and detected events to form tag data, asset data, and/or element data. The tag data is stored in the tag data storage area 116. The asset data is stored in the asset data storage area 118. The element data is stored in the element data storage area 120. The data mining process 122 mines the tag data, asset data, and/or element data based on data required by the Web server 98 to populate one or more of the Web pages with tracking information.

The report processor 124 is optional. If report processing is implemented, the report processor 124 selectively processes the tag data into tag reports, the asset data into asset reports, and the element data into element reports. The report processor 124 communicates the tag, asset, and element reports to the file server 100 for storage. For example, the tag reports may include: i) raw GPS position and time data, ii) XYZ position and time data, and iii) detected event data. Other type of tag reports are also possible. For example, the types of asset reports may include: i) asset log, ii) operation log, iii) operator log, iv) location and time in restricted area, v) location and time in hazardous area, vi) location and time off course, v) location and time in high stress condition, and vi) location and time of unexpected stoppage. Other types of asset reports are also possible. For example, the types of element reports may include: i) element log, ii) operation log, iii) operator log, iv) location and time in restricted area, v) location and time in hazardous area, vi) location and time off course, v) location and time in high stress condition, and vi) location and time of unexpected stoppage. Other types of element reports are also possible.

Notably, if the asset is an aircraft, the asset log available from the tracking information server 14 may be tailored to replace the traditional aircraft log. Similarly, the operation log may be tailored to replace the traditional flight operation log and the operator log may be tailored to replace the traditional pilot log. Another aircraft report could identify the number of hours the aircraft has been above 14,000 feet or pressurized. Moreover, if the element is a fuel pump on an aircraft engine, a location and time in high stress condition report can identify the total number of hours the engine has been exposed to high pressure conditions. Another fuel pump report could identify takeoffs and/or landings and associated conditions.

In the embodiment being described, the Web server 98 includes a data applet 126, a map applet 128, a map storage area 130, a tracking information module 132, and a tag/asset/element link input/edit module 134. The tracking information module 132 includes the set of Web pages. The tracking information module 132 presents tracking information to an authorized client user at a monitoring device 22 (FIG. 1) via the Web pages in response to client user selections and requests presented via one or more of the Web pages.

The map applet 128 and data applet 126 are web-based programs that respond to selections and requests by an authorized client user. Typically, the tracking information module 132 typically presents tracking information via a map retrieved from the map storage area 130, supplemental graphics overlaid on the map by the map applet 128 and supplemental text provided by the data applet 126. The map may be any map that is suitable for the type of asset being tracked. For example, the map storage area 130 may include one or more of a street map 136, an aviation map 138, a water map 140, a rail map 142, and a three-dimensional (3D) environment. Other types of maps may also be provided.

The map applet 128 may default to providing the aviation map 138 to an appropriate Web page for tracking an aircraft. The Web page may permit the client user to select a different map. If the client user selects a different map, the map applet 128 changes the Web page to the display the selected map. Similarly, the data applet 126 may retrieve certain tag, asset, and/or element data from the data warehouse 96 and provide it to a given Web page by default. The Web page may permit the client user to select additional or different tracking information. If so, the data applet 126 responds to client user selections and requests accordingly.

In conjunction with the map and textual position and time tracking information, the data applet 126 retrieves XYZ or XY position and time data from the data warehouse 96. The XYZ or XY position data is provided to the map applet 128 and the tracking information module 132. The map applet 128 generates an icon representing the XYZ or XY position on the map and overlays it on the map display provided to the tracking information module 132. Multiple types of icons may be used, as well as coloring, flashing, and other suitable attributes of the icon, to symbolize certain conditions associated with the asset. Of course, many other features that can be incorporated in Web pages can also be implemented to provide the tracking information.

Figure 12:
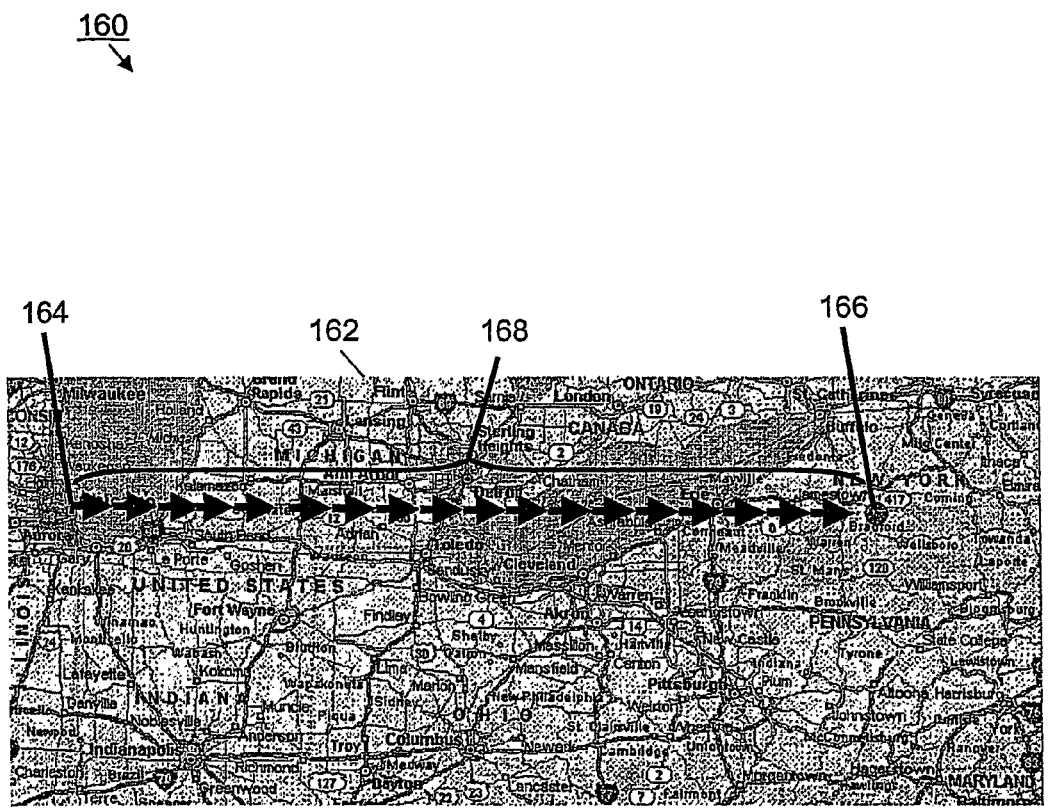
FIG. 12 illustrates an example of a portion of a monitoring device display showing a street map and tracking information in accordance with one aspect of the invention.

A sample map with several types of overlaid icons is provided in FIG. 12. While FIG. 12, does not include textual information, the XYZ or XY position and time can also be overlaid on the map at a suitable location. Morever, icons and data for additional assets can be overlaid on the map for tracking, for example, a fleet of aircraft or all airborne aircraft. The tracking information module 132 typically permits panning and zooming of the map display so that the client user can adjust the display to a particular preference.

The Web server 98 typically includes one or more Web pages that permit an authorized user to configure links and link information. The tag link input/edit module 134 works in conjunction with the one or more Web pages to collect the link and link information and communicate it to the data warehouse 96. The Web server 98 also typically includes Web pages that permit an authorized user to configure the tag profile 104.

Within the set of Web pages, the client user typically has access to textual information providing an audit trail for a particular tag, asset, and/or element. Notably, the concept of linking assets to tracker tags and elements to assets has the advantage of accumulating historical data for assets and elements that goes across different tracker tags and different assets. For example, if a tracker tag on an aircraft is replaced for any reason, the link between the asset and tracker tag is updated and the asset data for the aircraft includes data provided by the initial tracker tag and data provided by the new tracker tag. Thus, historical tracking information and reports for the aircraft can be comprehensive. Similarly, if a fuel pump for an aircraft engine happens to be removed from one aircraft and installed on another aircraft, the element data for the fuel pump is comprehensive as long as the link between the element and asset is updated.

In the embodiment being described, the file server 100 includes a tag reports storage area 144, an asset reports storage area 146, an element reports storage area 148, and a file transfer module 150. The file transfer module 150 retrieves tag, asset, and/or element reports from the storage in responds to requests for reports from the Web server 98. Typically, this is in response to selections or requests from the client user via a Web page.

In the embodiment being described, the client communication interface 102 includes a network interface 152, an Internet interface 154, an unsecured area 156, and a security check 158. The network interface 152 provides a standard interface to a communication network in the tracking information network. For example, the network interface 152 may connect to a LAN, wireless LAN, terrestrial telephone network, satellite system, or any other suitable communication network. The Internet interface 154 provides any type of standard interface to the Internet. Other suitable interfaces to the tracking information server 14 are also possible. Preferably, the monitoring device 22 accesses the tracking information server via the Internet interface 154.

The unsecured area 156 does not provide tracking information. This area requires the client user to perform a login sequence. The login information is provided to the security check 158 to determine whether or not the client user is authorized to enter the Web server for monitoring tracking information, to configure the tag profile 104, or configure links and link information. The unsecured area 156 maybe Web-based and may contain information describing the tracking system and/or tracking services.

With reference to FIG. 12, an example of a portion of a monitoring device 22 (FIG. 1) display shows a street map 162. An aircraft departing from Chicago, Ill. 164 and arriving in Jamestown, N.Y. 166. The tracking information 168 is shown by the sequence of arrows pointing from Chicago to Jamestown.

FIG. 12 illustrates a map showing a portion of the United States wherein the arrows from Chicago to Jamestown, N.Y. illustrate the path which would be visually shown to a user having access to the tracking system This would allow the user to constantly track the progress of the flight or ground vehicle of interest. It is also possible to provide such map tracking of watercraft.

Figure 13:
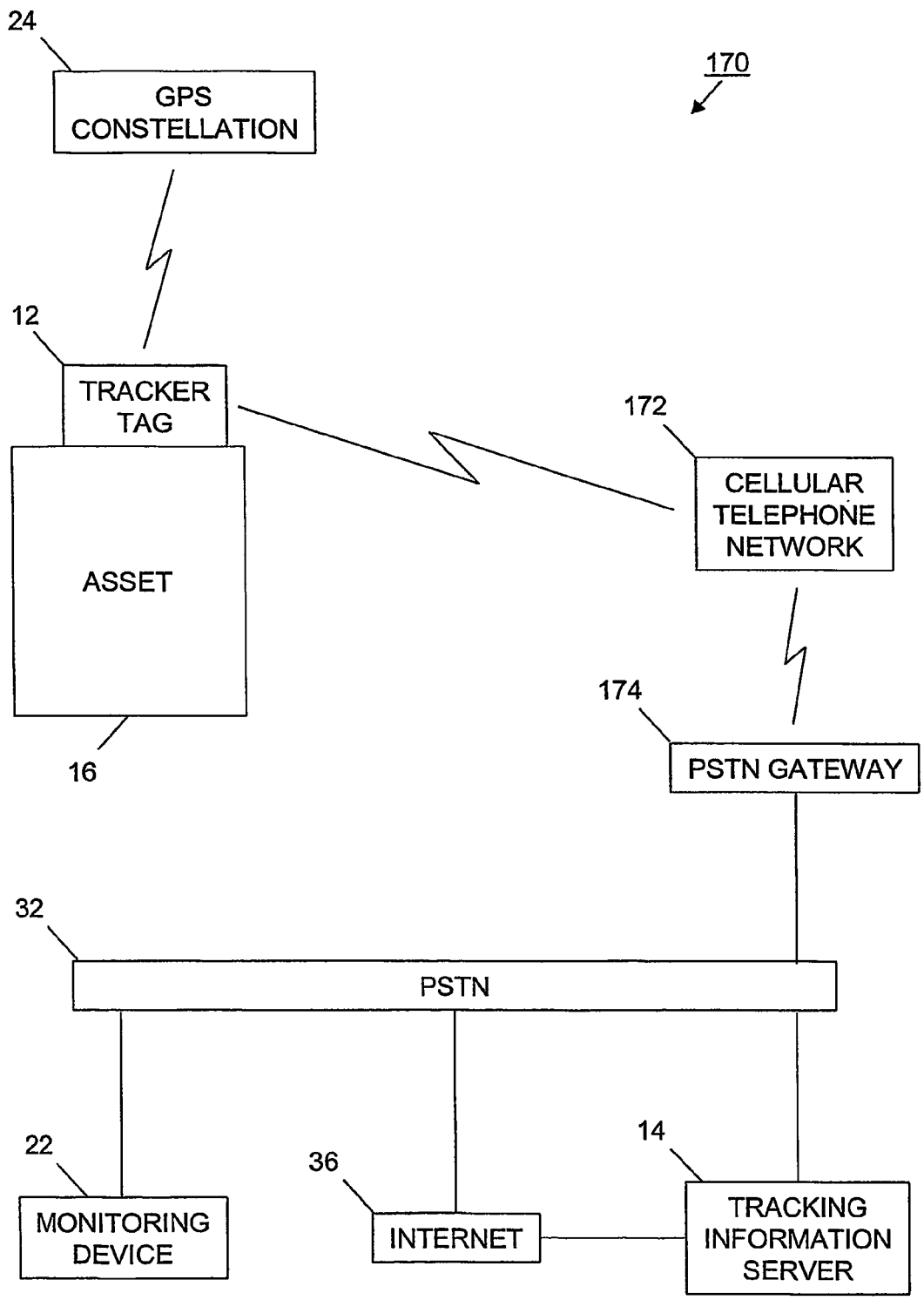
FIG. 13 is a block diagram of an embodiment of a regional tracking system incorporating the invention.

With reference to FIG. 13, an embodiment of a regional tracking system 170 includes the tracker tag 12, the tracking information server 14, the asset 16, the monitoring device 22, the GPS satellite constellation 24, the PSIN 32, the Internet 36, a cellular telephone network 172, and a cellular telephone/PSTN gateway 174. The trackertag 12, tracking information server 14, asset 16, monitoring device 22, and GPS satellite constellation 24 are as described above in reference to FIG. 1.

A regional implementation of the tracking system 170 is provided by a data communication network 18 (FIG. 1) and a tracking information network 20 (FIG. 1) that provide regional coverage (i.e., regional communications). The data communication network 18 (FIG. 1) is provided by a wireless terrestrial telephone system and a land line terrestrial telephone network. The preferred wireless terrestrial telephone system is a cellular telephone system. However, other wireless terrestrial telephone systems that provide regional coverage may be implemented The preferred terrestrial telephone network is the PSTN. However, other types of terrestrial telephone networks may be implemented. More specifically, the data communication network 18 (FIG. 1) is provided by the cellular telephone network 172, the cellular telephone/PSTN gateway 174, and the PSTN 32.

In the embodiment being described, the tracking information network 20 (FIG. 1) is provided by a terrestrial telephone system and the Internet 36. As shown, the preferred terrestrial telephone system is a land line telephone system. However, other terrestrial telephone systems that provide regional coverage may also be implemented in the regional tracking system 170. More specifically, the tracking information network 20 (FIG. 1) is provided by the PSTN 32 and the Internet 36.

Figure 14:
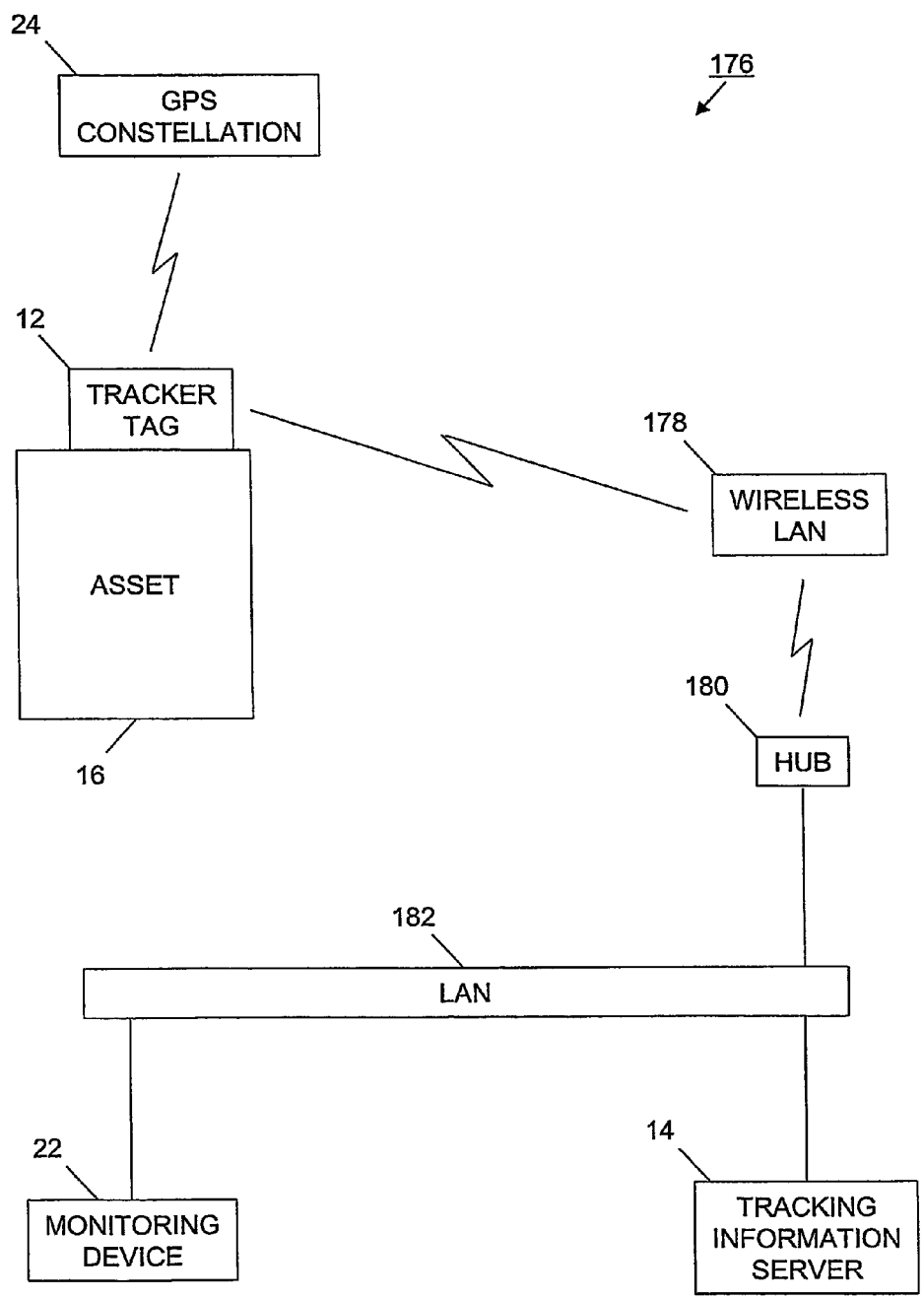
FIG. 14 is a block diagram of an embodiment of a local tracking system incorporating the invention.

With reference to FIG. 14, an embodiment of a local tracking system 176 includes the tracker tag 12, the tracking information server 14, the asset 16, the monitoring device 22, the GPS satellite constellation 24, a wireless LAN 178, a wireless LAN/LAN hub 180, and a LAN 182. The trackertag 12, tracking information server 14, asset 16, monitoring device 22, and GPS satellite constellation 24 are as described above in reference to FIG. 1.

A local implementation of the tracking system 170 is provided by a data communication network 18 (FIG. 1) and a tracking information network 20 (FIG. 1) that provide local coverage (i.e., local communications). The data communication network 18 (FIG. 1) is provided by the wireless LAN 178, wireless/wire line LAN hub 180, and wire line LAN 182. However, other local networks suitable for handling wireless data communication are also possible. The tracking information network 20 (FIG. 1) is provided by the wire line LAN 182. However, other local networks suitable for handling data communication are also possible.

In one embodiment of the invention, the tracker tag 12 (FIG. 1) includes a two-way radio and is operatively associated with an aircraft. The tracker tag receives data transmissions from the GPS satellites. A position of the aircraft can be determined from the GPS data. In addition, the tracker tag has the capacity to send data and/or receive commands from a tracking information server 14 (FIG. 1) transmitting and receiving radio signals at least partially via the Iridium satellite system. The tracker tag is preferably mounted on a high side of a wing or fuselage of an aircraft. For other modes of transportation, such as automobiles, trucks, boats and trains, the tracker tag is preferably mounted on the high side of these vehicles and craft to permit a line of sight to the sky. The tracker tag receives the GPS data from GPS satellites orbiting at high earth orbit and determines a position of the tracker tag in XYZ coordinates (X being latitude, Y being longitude and Z being altitude).

Additionally, the tracker tag includes a radio transmitter and radio receiver that can transmit the XYZ location in programmed tasks to communicate the position of the tracker tag to other orbiting satellites, for example, the Iridium satellite group, orbiting in low earth orbit. In essence, the tracker tag and the systems to support the function receive query pings from the ground (i.e., tracking system server 14 (FIG. 1)) and have the tracker tag receive the ping and then trigger a character string to be transmitted to the communication satellite systems to report the XYZ location in real-time. Repeated pings will be responded to with repeated XYZ locations to a high degree of accuracy, on the order of 18 inches of reliable accuracy. If the programmed task is to constantly report location, the tracker tag will, in programmed sequence, report the constant location of the tracker tag and thus the location of the aircraft, ground vehicle or watercraft.

These radio signals or data are translated as a coordinated point that is projected on template maps and charts as an icon representative of the particular tracker tag. For example, the tracker tag will include a unique number and identifier for the aircraft, ground vehicle and/or watercraft.

Encryption and data compression techniques will maintain the security of the system while at the same time giving access to subscribed users and/or authorized entities to receive "Tracker" information. Again, by using widely available and reliable technology, such as employed with pagers, cell phones, PDA computers and the Internet, this information can be effectively transmitted and received with a desired level of security.

The tracker tag and the supporting systems provide the location of any general aviation aircraft, ground vehicle, or watercraft, worldwide, as long as the tracker tag has line of sight to the sky. If line of sight to the sky is lost, the "Tracker" data would reflect the last position that the tracker tag was exposed to line of sight, for example, in front of the hanger where the aircraft, ground vehicle, or watercraft is stored. The "Tracker" data reflects any movement and location in real-time of any aircraft, ground vehicle, or watercraft equipped with the "Tracker" and supporting system.

In one embodiment, it is intended that a tracker tag be placed on every general aviation aircraft prior to take-off and the unique number of the tracker tag attached to the aircraft would be included in any flight plan and reporting of any flight condition associated with the aircraft.

The tracker tag preferably comprises three main sub-systems that, when assembled in a system, provide the ability to track the position and performance of an aircraft, ground vehicle, or watercraft anywhere in the world. The sub-systems are broken down into the following:

1. Power generation and conversion 47 (FIG. 7),
2. Data acquisition and processing 49 (FIG. 7), and
3. Data communication link 48 (FIG. 7).

The tracker tag is small enough to be attached directly to the top of the aircraft fuselage, ground vehicle or watercraft and is intended to be non-intrusive to any of the electrical and/or mechanical systems of these modes of transportation. The tracker tag autonomously collects and processes all data as it pertains to the aircraft, ground vehicle, or watercraft and its operating parameters. A fully integrated GPS receiver 65 (FIG. 7) provides positional information so that exact operational parameters are collected. Data is stored within the tracker tag for interrogation through several means. The tracker tag has the provisions to transfer the data at a prescribed maintenance interval by direct contact with the tracking information server, or the data may be collected in real-time through one of several remote wireless interfaces. These interfaces allow wide or local area connectivity.

In summary, some of the salient features that are part of this invention are as follows: differing from the art of the past, the tracker tag is a device that can be integrated into a larger system due to its low profile, service life, power supply (solar, piezoelectric power generation and backup battery), the ability to withstand extreme conditions of operation (−40° C. to a high end of +85° C.) and effectiveness at all altitudes.

The tracker tag is capable of receiving GPS data and responding and/or reporting location and other data using paging technology through a communication satellite. These communications will be enabled to display location on a video template, such as a map or a chart; that can be displayed using a standard personal computer, a pager device, a video display cell phone or a Web-enabled video PDA computer. It is presently contemplated that the system would use a Web site dedicated to display the exact location of the tracker tag anywhere in the world in the XYZ coordinates on a map/chart (provided the tracker tag has "line of sight" to the sky and communications (i.e., receiving and transmitting RF) are not impeded).

The tracking system, advantageously and seamlessly, integrates the GPS system, Iridium satellite system, ground-based telecommunication systems, and the Internet for communications and current "state-of-the-art" database storage (preferably systems that individually are in place and commercialized) in a manner that provides state of the art location in real time. The system allows users/subscribers to have access to exact location in real-time using commonly used personal computers or any data-capable display device through Internet access.

Flight data collection techniques for vibration, locations and reporting data accumulated in real-time (or as required by programmed tasking) can also be incorporated into the system. For example, vibration data recording, for accumulating empirical data to predict fuel pump condition and reliability, can be collected and analyzed for servicing decisions. Similarly, the tracking tag can integrate a GPS and environmental sensing techniques through the use of an accelerometer or another type of vibration sensor. In one embodiment, the power generation for GPS, radio transceiver, and other components in the tracker tag provides desired independence for the system Stated another way, the tracker tag can provide real-time communication of certain operational/environmental parameters through a passive sensing device on an aircraft, ground vehicle, or watercraft as well as reporting the location of the aircraft, ground vehicle, or watercraft because the tracker tag is separately powered and not under the control of the aircraft, ground vehicles or watercraft or its operator/crew (i.e., staff). Data associated with the tracking system can be displayed on various common devices (e.g., typical displays found on pagers, cell phones, wireless PDA computers) and is accessible over the Internet. A scalable computer architecture and design permits the system to handle all the data (database warehousing and distribution) that is being received (encoded, encrypted and compressed) from multiple tracker tags and create displays individually tailored to users/subscribers on pagers, cell phones and/or PDA computers via the Internet.

Figure 15:
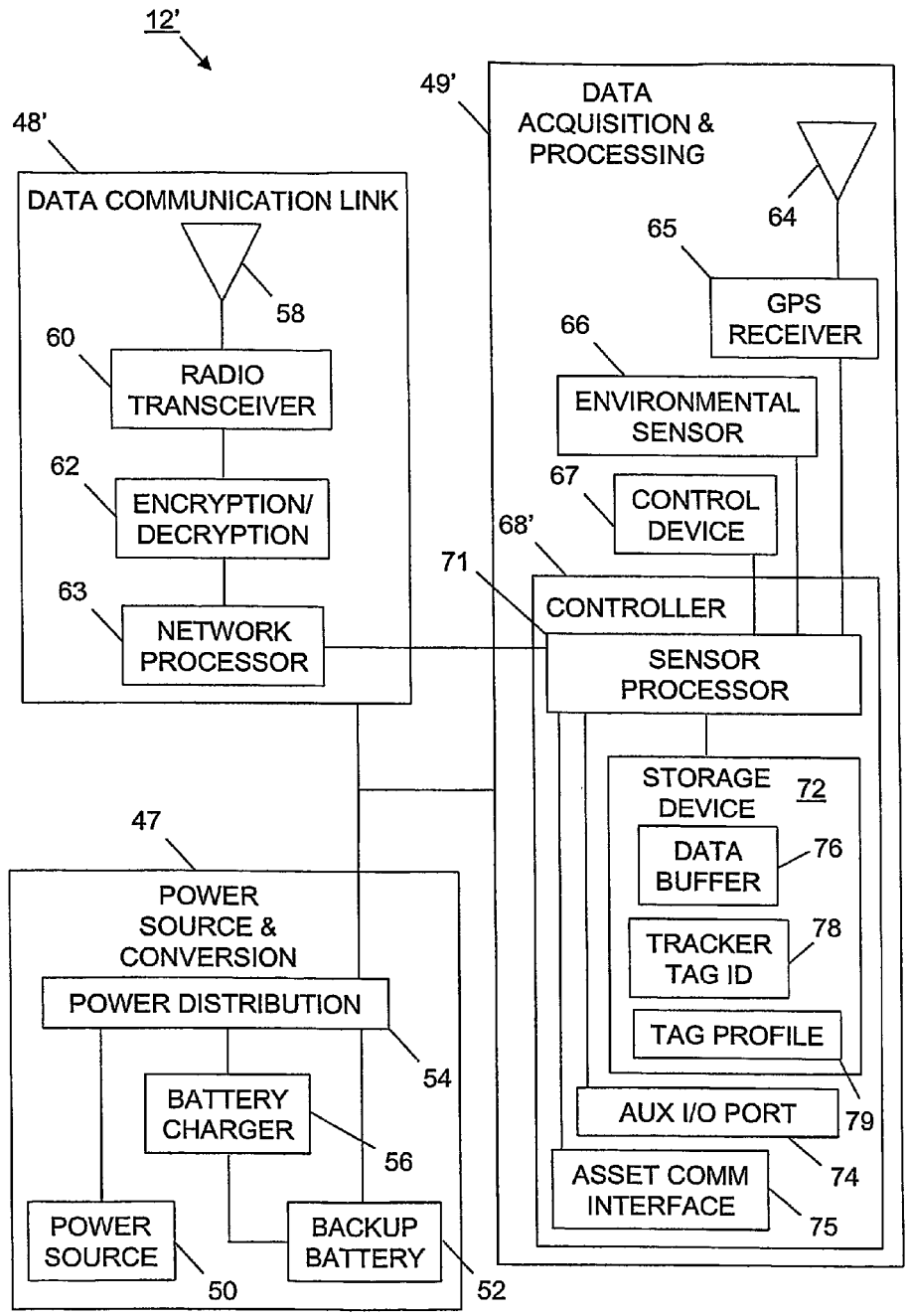
FIG. 15 is a block diagram of another embodiment of a tracker tag.

With reference to FIG. 15, another embodiment of the tracker tag 12' includes the power source and conversion module 47, a data communication link 48', and a data acquisition and processing module 49'. The power source and conversion module 47 operates as described above in reference to FIG. 7. The data acquisition and processing module 49' selectively receives position and time data from GPS satellites 240 (FIG. 3) within line of site of the tracker tag 12' and generally processes the raw GPS position and time data as described above in reference to FIG. 7. The data acquisition and processing module 49' also selectively communicates the combined position and time data to the data communication link 48' as generally described above in reference to FIG. 7. The data communication link 48' selectively transmits the combined position and time data to the tracking information server 14 (FIG. 1) via the data communication network 18 (FIG. 1) generally as described above in reference to FIG. 7. The data communication link 48 also receives command and control information from the tracking information server 14 (FIG. 1) generally as described above in reference to FIG. 7.

In the embodiment being described, the data communication link 48' includes the RF antenna 58, radio transceiver 60, encryption/decryption process 62, and a network processor 63. The RF antenna 58, radio transceiver 60, and encryption/decryption process 62 operate as described above in reference to FIG. 7. The network processor 63 selectively initiates communications to receive an updated tag profile with the latest programmed instructions from the tracking information server 14 (FIG. 1) via, for example, the e-mail system (e.g., POP3 e-mail server). The network processor 63 also selectively initiates communications to transit the combined position and time data to the tracking information server 14 (FIG. 1). As described above, the combined position and time data may also include sensor data. The network processor 63 may also selectively initiate communications to page authorized users of the tracking information server 14 (FIG. 1) to notify them that certain conditions have occurred. In the tracker tag 12 shown in FIG. 7, these functions may be incorporated in the processor 70 (FIG. 7) of the controller 68 (FIG. 7). In the embodiment being described, use of the network processor 63 to control data communications permits it to be either shut down or placed in a sleep state when data communications are not required. This permits the tracker tag 12' to incorporate additional power management features that conserve power and extend the life of the power source 50.

In the embodiment being described, the data acquisition and processing module 49' includes the GPS antenna 64, GPS receiver 65, environmental sensor 66, control device 67, and a controller 68'. The GPS antenna 64, GPS receiver 65, environmental sensor 66, and control device 67 operate as described above in reference to FIG. 7. The controller 68' generally receives and processes position, time, and sensor data as describe above in reference to FIG. 7. The controller 68' also selectively communicates the combined position and time data to the data communication link 48' generally as shown in FIG. 7.

As described above in reference to FIG. 7, the environmental sensor 66 is optional and may include one or more of various types of sensors. Including vibration sensors, temperature sensors, strain gauges, voltage sensors, pressure sensors, electric field (e-field) sensors, and sensors capable of measuring other quantifiable parameters. Thus, the environmental sensor 66 represents any combination of one or more of any type of sensor.

Any sensor can be used by the controller 68' to detect an event and subsequently change operation of the tracker tag 12'. Similarly, the controller 68' can use the position and/or time data from the GPS satellites 240 to detect events and subsequently change operation. Several types of detected events include change in state conditions, data acquisition conditions, and data download conditions. Moreover, when combined position and time data is transmitted to the tracking information server 14 (FIG. 1) it may include the position, time, and sensor data associated with detected events since the last data download.

The controller 68' may use a change in state condition to wake up or start up the network processor 63 with instructions to check if a new tag profile has been configured by an authorized user of the tracking information server 14 (FIG. 1). If a new tag profile is found, it is retrieved by the network processor 63 and communicated to the controller 68'. The controller 68' installs the new programmed instructions contained in the new tag profile. Then, the controller 68' responds to subsequent change in state, data acquisition, and data download conditions in accordance with its current programmed instructions. The controller 68' may use a data acquisition condition to acquire and store sensor, position, and/or time data in accordance with its current programmed instructions. The controller 68' may use a data download condition to wake up or start up the network processor 63 with an instruction to download with the data currently stored by the controller 68' to the tracking information server 14 (FIG. 1). Once communications for the data download are established, the controller 68' communicates the stored data to the network processor 63 which passes it on to the tracking information server 14 (FIG. 1).

In the embodiment being described, the controller 68' includes a sensor processor 71, storage device 72, auxiliary I/O port 74, and an asset communication interface 75. The sensor processor 71 is in communication with the GPS receiver 65, environmental sensor 66, control device 67, storage device 72, auxiliary I/O port 74, asset communication interface 75, and data communication link 48. The storage device 72 includes the data buffer 76, tracker tag identification data 78, and tag profile 79 and operates as described above in reference to FIG. 7. The tag profile 79 includes commands and instructions associated with change in state, data acquisition, and data download conditions as well as various other events that the tracker tag 12' is programmed to detect. The auxiliary I/O port 74 operates as described above in reference to FIG. 7. Upon an appropriate data acquisition condition, the sensor processor 71 receives position and time data from the GPS receiver 65, combines the raw GPS position and time data to form the combined position and time data, and selectively stores the combined position and time data in the data buffer 76. Upon an appropriate data download condition, the sensor processor. 71 selectively communicates the combined position and time data from the data buffer 76 to the data communication link 48.

The asset communication interface 75 is optional and is adapted to receive information from one or more asset/transport vehicle sensors monitor certain environmental and/or operational characteristics and to transmit information to one or more asset/transport vehicle control devices to control certain aspects of operation of the asset and/or transport vehicle. The information from the asset/transport vehicle sensors may be used by the trackertag 12' to identify change in state, data acquisition, data download conditions, and other detected events associated with operation of the tracker tag 12'. The information from the asset/transport vehicle sensors may also be used by the tracker tag 12' to identify asset/transport vehicle control conditions. Similarly, the tracker tag 12' may use sensor, position, and or time data to identify asset/transport vehicle control conditions. The tracker tag profile 79 may include commands and instructions associated with asset/transport vehicle control conditions as well as change in state, data acquisition, and data download conditions based on events detected by the one or more asset/transport vehicle sensors.

The asset communication interface 75 may implement various wire line and/or wireless technologies. When the asset communication interface 75 is by wire line, it includes an appropriate connector and an interface adapter compatible with communication protocols to the sensor processor and the corresponding devices in the asset/transport vehicle. Similarly, when the asset communication interface 75 is wireless, it includes an appropriate interface adapter compatible with communication protocols to the sensor processor and the corresponding devices in the asset/transport vehicle and an antenna/transceiver module. Accordingly, the asset communication interface 75 may implement any suitable type of wire line and/or wireless technology, including various types of serial or parallel buses (e.g., CAN bus, USB, etc.), Ethernet (e.g., IEEE 802.3, IEEE 802.11, etc.), or Bluetooth.

The sensor processor 71 may include the resolving algorithm described above in reference to FIG. 1. When using the resolving algorithm, the sensor processor 71 may temporarily store the combined position and time data while generating the XYZ or XY data and associated time data. Once the XYZ or XY data and associated time data is generated it is stored in the data buffer 76 and the corresponding raw GPS position and time data is purged. The combined position and time data communicated to the data communication link 48 includes the XYZ or XY data and associated time data instead of the raw GPS position and time data.

For example, if the environmental sensor 66 is implemented in the form of a vibration sensor or accelerometer, the sensor processor 71 detects events associated with vibration measurements by the vibration sensor. In another example, the sensor processor 71 may use the XYZ or XY data to detect additional events related to the position of the asset. The sensor processor 71 compares the XYZ or XY data to predetermined XYZ or XY coordinate limits identified in the commands and control information of the tag profile 79 to detect certain events, such as change in state, data acquisition, data download, and asset/transport vehicle control conditions. More specifically, the sensor processor 71 may detect when the asset is i) in the proximity of a restricted area, ii) in a restricted area, iii) in the proximity of a hazardous area, iv) in a hazardous area, v) at a way point, vi) at a destination, vii) off course, viii) nearing a high stress condition, ix) experiencing a high stress condition, x) experiencing excessive loss of altitude, xi) experiencing excessive increase in altitude, xii) experiencing unexpected stoppage or significant slow down, or xiii) exceeding a speed restriction. These types of detected events may be specified as change in state, data acquisition, data download, and asset/transport vehicle control conditions in the tag profile 79. Of course, additional types of detected events are also possible, particularly in conjunction with the environmental sensor 66 (e.g., vibration, temperature, strain, voltage, pressure, and e-field sensors) and asset/transport vehicle sensors.

In summary, the sensor processor 71 detects the events specified in the programmed instructions within the tag profile 79 to identify change in state, data acquisition, and data download conditions associated with the GPS position and time data. Additionally, if one or more environmental sensor 66 is implemented, the sensor processor 71 detects the events specified in the programmed instructions within the tag profile 79 to identify change in state, data acquisition, and data download conditions. Similarly, if the asset communication interface 75 is implemented for receiving information from one or more asset/transport vehicle sensors, the sensor processor 71 detects the events specified in the programmed instructions within the tag profile 79 to identify additional change in state, data acquisition, and data download conditions associated with the one or more asset/transport vehicle sensors. Moreover, if the asset communication interface 75 is implemented for transmitting information to asset/transport vehicle control devices, the sensor processor 71 detects the events specified in the programmed instructions within the tag profile 79 to identify asset/transport vehicle control conditions associated with the one or more environmental sensor 66 and/or the one or more asset/transport vehicle sensors.

Typically, the sensor processor 71 selectively stores position, time, and sensor data associated with detected events such as change in state, data acquisition, data download, and asset/transport vehicle control conditions. This detected event data is stored along with any combined position and time data that is utilized for tracking. Like detected events associated with vibration, the sensor processor 71 may use any of the detected events associated with position and time to determine whether or not the tracker tag 12' should begin receiving the position and time data, storing the combined position and time data, and transmitting the combined position and time data. Additionally, the data associated with any type of detected event can be included in the tracking information provided to the subscriber/client user at the monitoring device 22 (FIG. 1).

The sensor processor 71 receives command and control information from the network processor 63 of the data communication link 48'. In one embodiment, the network processor 63 receives the command and control information by logging in to the e-mail system (e.g., POP3 e-mail server) and retrieving e-mail to an e-mail address associated with the tracker tag 12'. In this embodiment, the command and control information is included in an e-mail message from the tracking information server 14 (FIG. 1). The e-mail message having been created by an authorized user of the monitoring device 22 (FIG. 1). The e-mail system may be the messaging system 93 within the tracking information server 14 or through an independent e-mail service provider. The information stored in the tag profile 79 may be initially predetermined. The command and control information in the e-mail message may be provided as programmed instructions in a new tag profile. The new tag profile is communicated by the network processor 63 to the sensor processor 71. The sensor processor 71 may write or mask the new tag profile over the programmed instructions in the current tag profile 79 to update the tag profile 79 based on the e-mail message.

The sensor processor 71 manages data transmissions to the tracking information server 14 (FIG. 1) and power consumption by controlling when the network processor 63 sends combined position and time data and checks for a new tag profile with programmed instructions. Typically, the sensor processor 71 controls data transmissions in a burst fashion by waiting for a data download condition to be detected before waking up or starting up the network processor 63. Then, after the data transmission is confirmed, the sensor processor 71 may place the network processor 63 in a sleep state or shut it down. Additionally, the sensor processor 71 preferably controls checking for the new tag profile by waiting for a change in state condition to be detected before waking up or starting up the network processor 63. Then, after the sensor processor 63 provides the new tag profile to the sensor processor 71 or confirms that no new tag profile was found, the sensor processor 71 may again place the network processor 63 in a sleep state or shut it down.

The sensor processor 71 encodes each transmission burst with tracker tag identification data 78 so that the tracking information server 14 (FIG. 1) can associate the data transmitted with the appropriate tracker tag 12'. Sensor, position, and time data associated with detected conditions (or events) is also typically stored in the data buffer 76. A data transmission may include the sensor, position, and time data associated with detected conditions along with the combined position and time data used for tracking.

Figure 16:
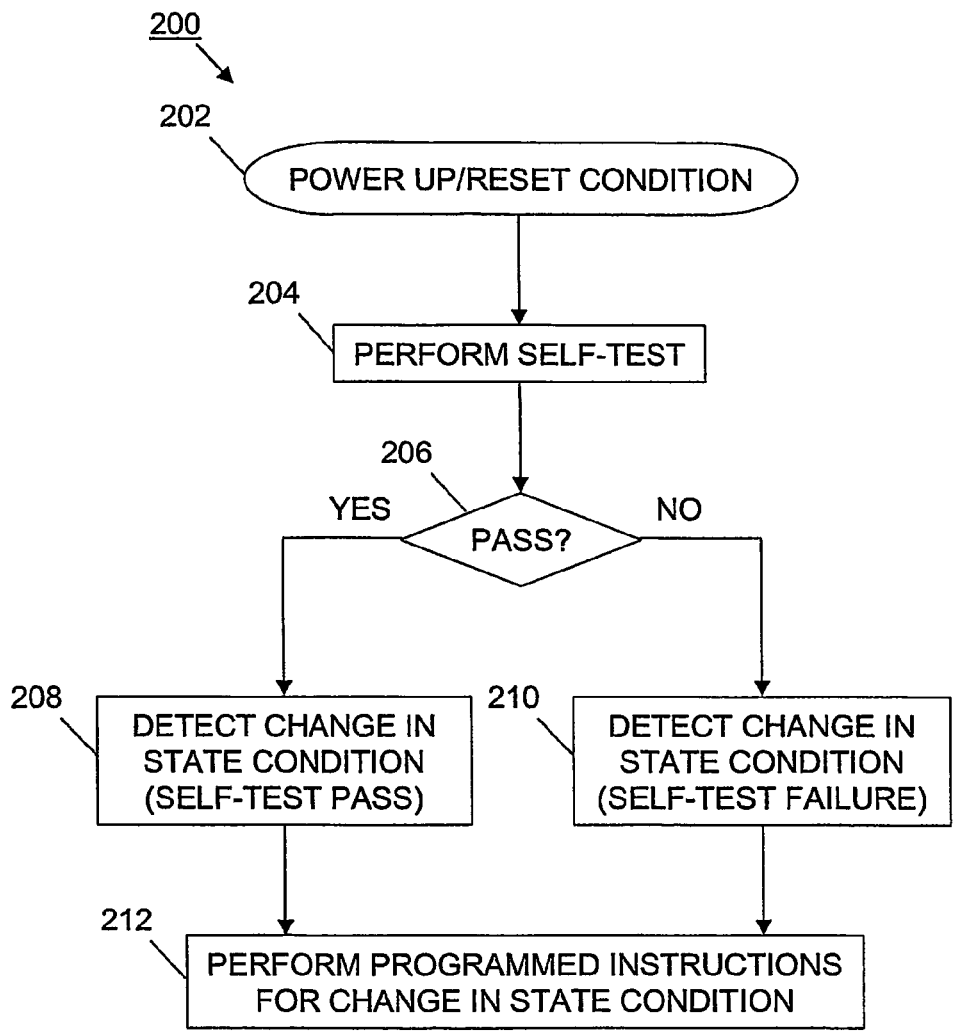
FIG. 16 is a flow chart of an embodiment of operation of a tracker tag in response to a power up/reset condition.

With reference to FIG. 16, an embodiment of a process 200 for a tracker tag to respond to a power up/reset condition begins at step 202 where the power up/reset condition is initiated by, for example, activation of the control device 67 (FIG. 15). Next, at step 204 a self-test of the tracker tag is performed. At step 206, the process determines if the self-test passed or failed. If the self-test passed, the process detects the completion of the self-test as a change in state condition based on a self-test pass event (step 208). Conversely, if the self-test failed, the process detects the completion of the self-test as a change in state condition based on a self-test fail event (step 210). After step 208 or step 210, the process performs programmed instructions for a change in state condition in accordance with the current tag profile 79 (FIG. 15).

Figure 17:
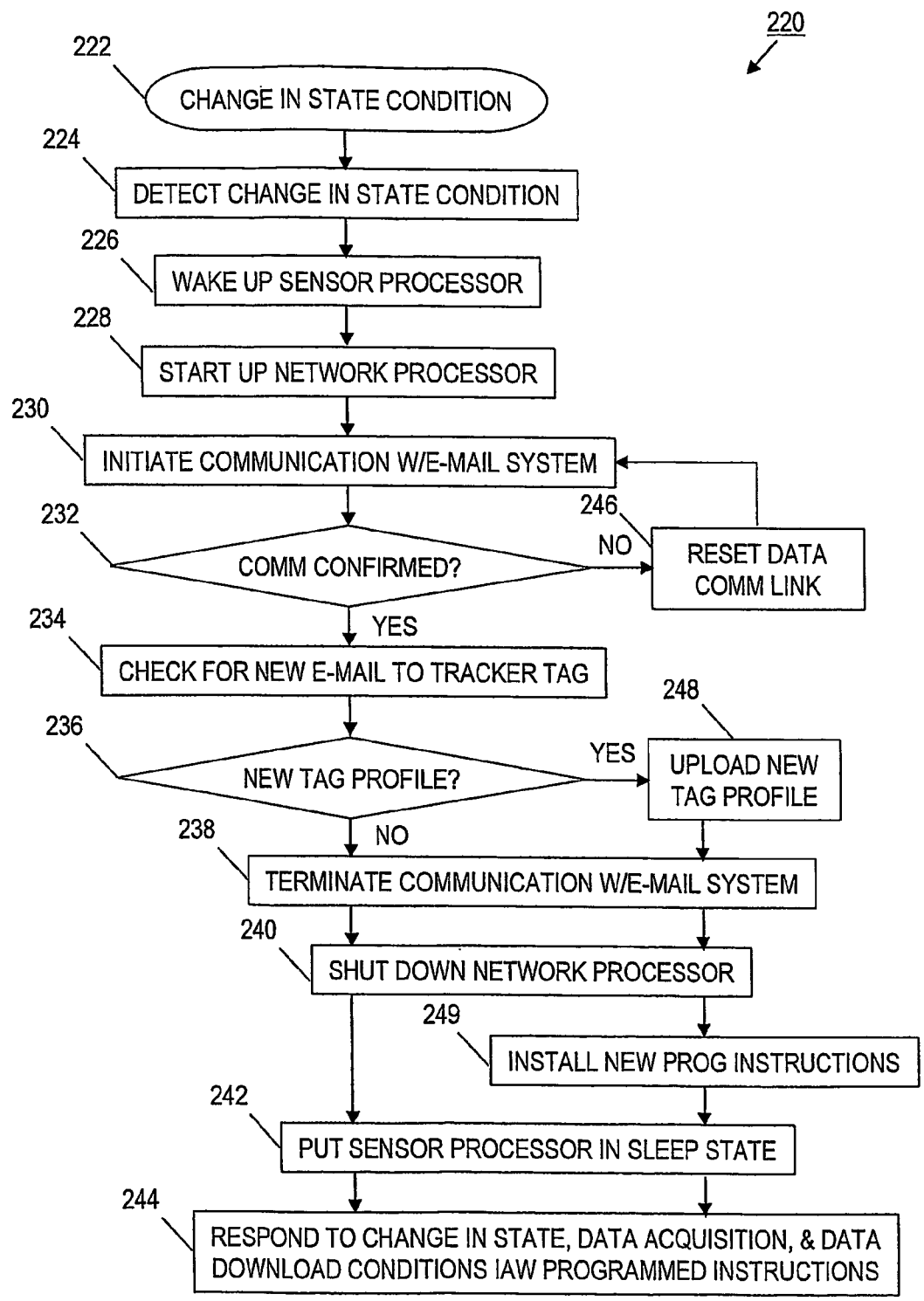
FIG. 17 is a flow chart of an embodiment of operation of a tracker tag in response to a change in state condition.

With reference to FIG. 17, an embodiment of a process 220 for a tracker tag to respond to a change in state condition begins at step 222. At step 222, it is presumed that the tracker tag is powered up and that the power up/reset condition of FIG. 16 is completed. Next, the change in state condition is detected (step 224). One or more change in state conditions are defined in the current tag profile in the storage device of the corresponding tracker tag. Typically, the change in state conditions are defined in terms of position, time, temperature, strain, voltage, pressure, e-field, self-test, and other parameters associated with sensors associated with the tracker tag, asset, and/or transport vehicle. Note that the position and time parameters are associated with the position and time data received by the GPS receiver. Otherwise, the parameters for change in state conditions are associated with measurements by corresponding sensors. Thus, the change in state condition is detected by comparing a change in state parameter in the current tag profile to a measurement from a corresponding sensor or to the GPS position or time data. The sensor processor includes algorithms for comparing sensor, position, and time data to the change in state parameters in the tag profile to detect change in state conditions, including algorithms to convert the measured data and/or the parameters for the comparison.

At step 226, once a change in state condition is detected, the sensor processor wakes up from a sleep state. Next, the sensor processor starts up the network processor (step 228). At step 230, the network processor initiates communication with the e-mail system (e.g., POP3 e-mail server) responsible for handling e-mail messages containing new tag profiles with new programmed instructions for the tracker tag from the tracking information server. The e-mail system may be the messaging system 93 within the tracking information server 14 (FIG. 1) or provided by an independent e-mail service provider. Next, the process confirms that communications between the network processor and the e-mail system have been established (step 232). If communications are confirmed, at step 234 the network processor checks for new e-mail to the tracker tag. Next, the network processor determines whether or not there is a new 1tag profile for the tracker tag based on whether or not there is new e-mail (step 236). If there is no new tag profile (i.e., no new e-mail), at step 238, the network processor terminates communications with the e-mail system. Next, the sensor processor shuts down the network processor (step 240). At step 242, the sensor processor goes into a sleep state. Next, the process performs programmed instructions for change in state, data acquisition, and data download conditions in accordance with the current tag profile 79 (FIG. 15).

At step 232, if communications between the network processor and the e-mail system are not confirmed, the network processor resets the data communication link of the tracker tag and returns to step 230 to try again (step 246).

At step 236, if there is a new tag profile (i.e., new e-mail), at step 248, the network processor uploads the new tag profile. Next, the network processor terminates communications with the e-mail system (step 238). At step 240, after the network processor communicates the new tag profile to the sensor processor, the sensor processor shuts down the network processor. Next, the sensor processor installs the new programmed instructions from the new tag profile into the tag profile 79 (FIG. 15) within the storage device 72 (FIG. 15) associated with the sensor processor 71 (FIG. 15) (step 249). The new programmed instructions overwrite corresponding programmed instructions. However, if a programmed instruction is not altered by the new programmed instructions it will remain in effect unless the new programmed instructions specify that it is to be deleted. At step 242, the sensor processor goes into a sleep state. Next, the process performs programmed instructions for change in state, data acquisition, and data download conditions in accordance with the current tag profile 79 (FIG. 15) (i.e., including the new programmed instructions).

In another embodiment of the process for handling a change in state condition, a text messaging system may be used in place of the e-mail system. In still another embodiment, direct two-way communication may be used in place of the e-mail system.

In another embodiment of the process for handling a change in state condition, the network processor may be brought out of a sleep state in step 228 and returned to a sleep state in step 240 instead of the start up and shut down operations referred to in FIG. 17. In still another embodiment, steps 226, 228, 240, and 242 are removed and both the network and sensor processors remain in full up operation during the process. In yet another embodiment, steps 228 and 240 are removed and the network and sensor processor are combined in a single processor. The single processor may either be brought out of a sleep state in step 226 and returned to a sleep state in step 242 like the sensor processor or remain in full up operation during the process.

With reference to FIGS. 15, 16, and 17, for example, note that the tracker tag 12' may be programmed to periodically perform a self-test which creates at least a periodic change in state condition and a corresponding periodic communication with the e-mail system. In one embodiment, the tracking information server 14 (FIG. 1) can determine that the tracker tag 12' is either shut down or unable to communicate with the e-mail system if an e-mail to the tracker tag 12' was not retrieved within the periodic self-test interval for the tracker tag 12'. Thus, the tracking information server can identify a situation where the tracker tag is not communicating with the e-mail system when it is expected to be communicating as a problem so that maintenance personnel can investigate the situation.

Figure 18:
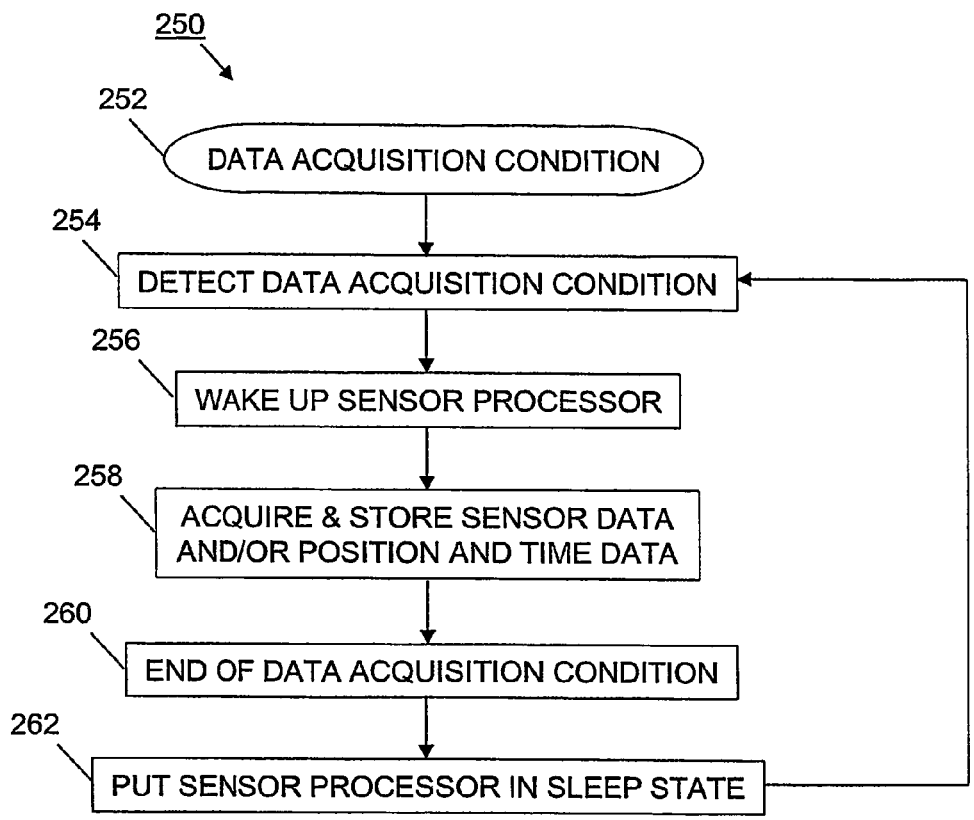
FIG. 18 is a flow chart of an embodiment of operation of a trackertag in response to a data acquisition condition.

With reference to FIG. 18, an embodiment of a process 250 for a tracker tag to respond to a data acquisition condition begins at step 252. At step 252, it is presumed that the tracker tag is powered up and that the power up/reset condition of FIG. 16 is completed. Preferably, the change in state condition of FIG. 17 has also been completed. Next, the data acquisition condition is detected (step 254). One or more data acquisition conditions are defined in the current tag profile in the storage device of the corresponding tracker tag. Typically, the data acquisition conditions are defined in terms of position, time, temperature, strain, voltage, pressure, e-field, self-test, and other parameters associated with sensors associated with the tracker tag, asset, and/or transport vehicle. Note that the position and time parameters are associated with the position and time data received by the GPS receiver. Otherwise, the parameters for data acquisition conditions are associated with measurements by corresponding sensors. Thus, the data acquisition condition is detected by comparing a data acquisition parameter in the current tag profile to a measurement from a corresponding sensor or to the GPS position or time data. The sensor processor includes algorithms for comparing sensor, position, and time data to the data acquisition parameters in the tag profile to detect data acquisition conditions, including algorithms to convert the measured data and/or the parameters for the comparison.

At step 256, once a change in state condition is detected, the sensor processor wakes up from a sleep state. Next, the sensor processor acquires and stores sensor data and/or position and time data in accordance with the programmed instructions in the current tag profile (step 258). The sensor processor may include algorithms for converting sensor, position, and time data into suitable information for local storage and subsequent use by the tracking information server. For example, the position resolving algorithm described above converts the raw GPS position data into XYZ or XY data.

At step 260, the data acquisition condition ends. Typically, this is simply after sufficient time has passed so that valid measurements can be obtained from the sensor and/or GPS position and time data However, the tag profile may define the end of data acquisition condition in a manner that is detected. For example, the tag profile may include programmed instructions for continuous data acquisition after the temperature rises above 40 degrees F. until it drops below 40 degrees F. Data acquisition and storage begins after the first condition is detected and continues until the second condition is detected. In another example, the tag profile may include programmed instructions specifying data acquisition for five minutes after an aircraft takeoff (e.g., vibration measurement) is detected. In this example, the data acquisition condition is detected from, for example, a vibration measurement and ends after five minutes has expired.

Next, the sensor processor goes into a sleep state (step 262). From this point, the process returns to step 254 when another data acquisition condition is detected.

In another embodiment of the process for handling a data acquisition condition, steps 256 and 262 are removed and the sensor processor remains in full up operation during the process.

Figure 19:
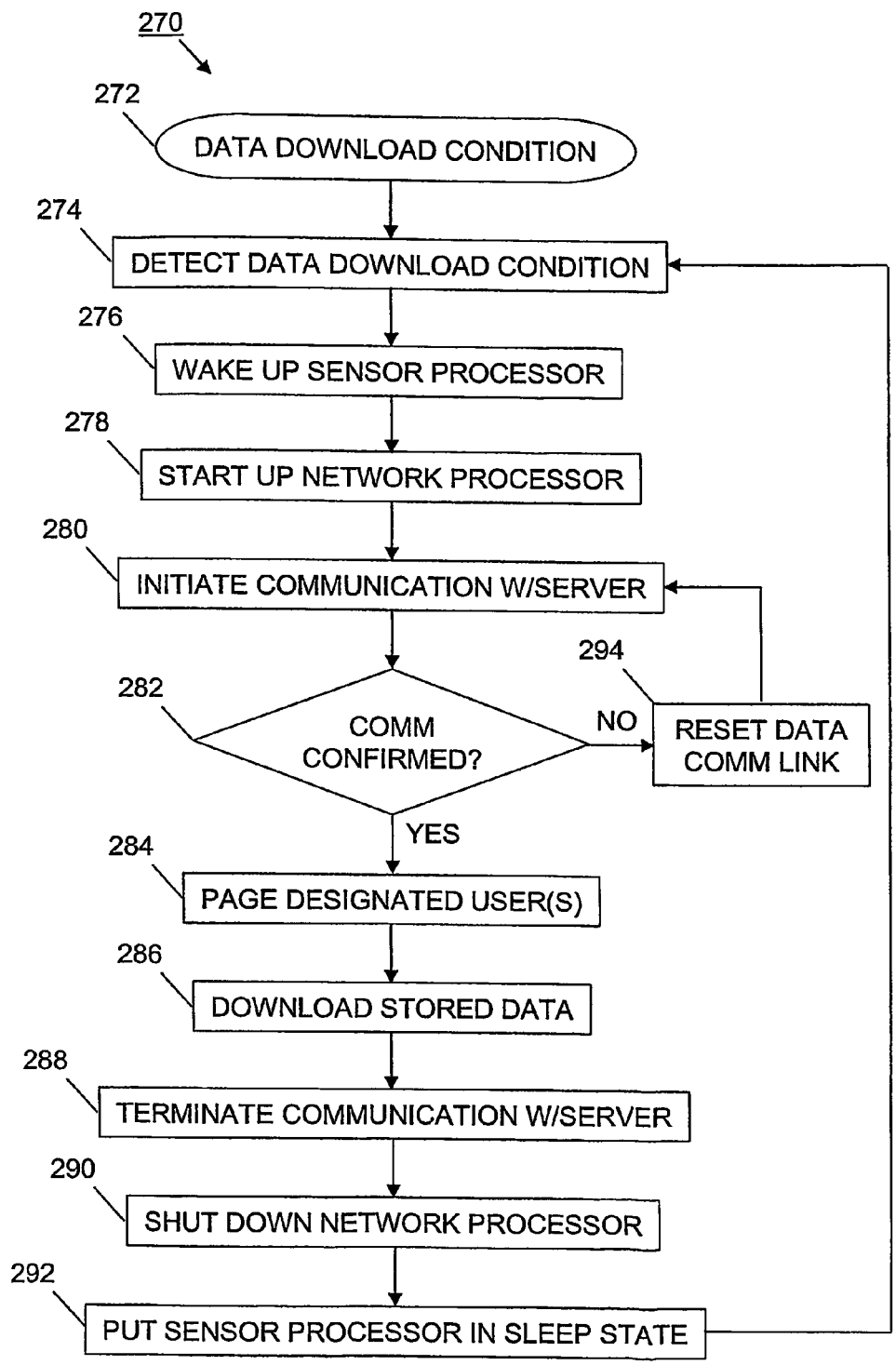
FIG. 19 is a flow chart of an embodiment of operation of a tracker tag in response to a data download condition.

With reference to FIG. 19, an embodiment of a process 270 for a tracker tag to respond to a data download condition begins at step 272. At step 257, it is presumed that the tracker tag is powered up and that the power up/reset condition of FIG. 16 is completed. Preferably, the change in state condition of FIG. 17 has also been completed. Next, the data download condition is detected (step 274). One or more data acquisition conditions are defined in the current tag profile in the storage device of the corresponding tracker tag. Typically, the data acquisition conditions are defined in terms of position, time, temperature, strain, voltage, pressure, e-field, self-test, and other parameters associated with sensors associated with the tracker tag, asset, and/or transport vehicle. Note that the position and time parameters are associated with the position and time data received by the GPS receiver. Otherwise, the parameters for data download conditions are associated with measurements by corresponding sensors. Thus, the data download condition is detected by comparing a data download parameter in the current tag profile to a measurement from a corresponding sensor or to the GPS position or time data. The sensor processor includes algorithms for comparing sensor, position, and time data to the data download parameters in the tag profile to detect data download conditions, including algorithms to convert the measured data and/or the parameters for the comparison.

At step 276, once a data download condition is detected, the sensor processor wakes up from a sleep state. Next, the sensor processor starts up the network processor (step 278). At step 280, the network processor initiates communication with the tracking information server tracking information server 14 (FIG. 1). Next, the process confirms that communications between the network processor and the tracking information server have been established (step 282). If communications are confirmed, at step 284 the network processor sends a page to one or more users identified in the programmed instructions of the tag profile for receiving a page in conjunction with the detected data download condition. Typically, the page is a text message to the user identifying the tracker tag, asset, and data download condition. The text message may be delivered to the user by the tracking information server via a paging system. Next, the sensor processor communicates the sensor, position, and time data stored in the data buffer of the storage device to the network processor and the network processor downloads the stored data to the tracking information server 14 (FIG. 1) (step 286). At step 288, the network processor terminates communications with the tracking information server. Next, the sensor processor shuts down the network processor (step 290). At step 292, the sensor processor goes into a sleep state. From this point, the process returns to step 274 when another data download condition is detected.

At step 282, if communications between the network processor and the tracking information server are not confirmed, the network processor resets the data communication link of the tracker tag and returns to step 280 to try again (step 294).

In another embodiment of the process for handling a data download condition, a text messaging system may be used in place of the paging system. In still another embodiment, the e-mail system (e.g., POP3 e-mail server) may be used in place of the paging system. In yet another embodiment, an combination of the paging, text messaging, and e-mail systems may be used to deliver the text message to the user. In still yet another embodiment, the network processor may initiate separate communications to deliver the text message and download the stored data. In this embodiment, the text message may be communicated to an independent service provider associated with the paging system, text messaging system, and/or e-mail system instead of the tracking information server.

In another embodiment of the process for handling a data download condition, the network processor may be brought out of a sleep state in step 278 and returned to a sleep state in step 290 instead of the start up and shut down operations referred to in FIG. 19. In still another embodiment, steps 276, 278, 290, and 292 are removed and both the network and sensor processors remain in full up operation during the process. In yet another embodiment, steps 278 and 290 are removed and the network and sensor processor are combined in a single processor. The single processor may either be brought out of a sleep state in step 276 and returned to a sleep state in step 292 like the sensor processor or remain in fill up operation during the process.

In one embodiment, the tracker tag 12' (FIG. 15) may include the power up/reset condition process 200 (FIG. 16), change in state condition process 220 (FIG. 17), data acquisition condition process 250 (FIG. 18), and data download condition process (FIG. 19). In this configuration, the power up/reset condition process 200 is performed first, then the change in state condition process 220 is performed when a first change in state condition is detected. Next, the data acquisition condition process 250 is performed to acquire and store data. This is followed by the data download condition process 270 which downloads the stored data from the tracker tag to the tracking information server.

Typically, the programmed instructions in the tag profile are such that the sensor, position, or time data causing the first change in state condition also causes a first data acquisition condition and a first data download condition to be detected. For example, the programmed instructions may specify that change in state conditions are detected when there is a transition from engine off to engine running and when there is a transition from engine running to engine off in conjunction with the vibration sensor. The programmed instructions may also specify that data acquisition conditions are detected for position data and time data when a vibration change in state condition is detected and every ten minutes thereafter while the engine is running. Additionally, the programmed instructions may specify that data download conditions are detected for all stored data when a vibration change in state condition is detected and every two hours thereafter while the engine is running.

A priority scheme of servicing change in state conditions ahead of data acquisition conditions and data acquisition conditions ahead of data download conditions may be implemented. The priority scheme may further provide for servicing multiple change in state conditions, multiple data acquisition conditions, and multiple data download conditions on a first in time basis. In one embodiment, multiple data acquisition conditions may be serviced in parallel.

Figure 20:
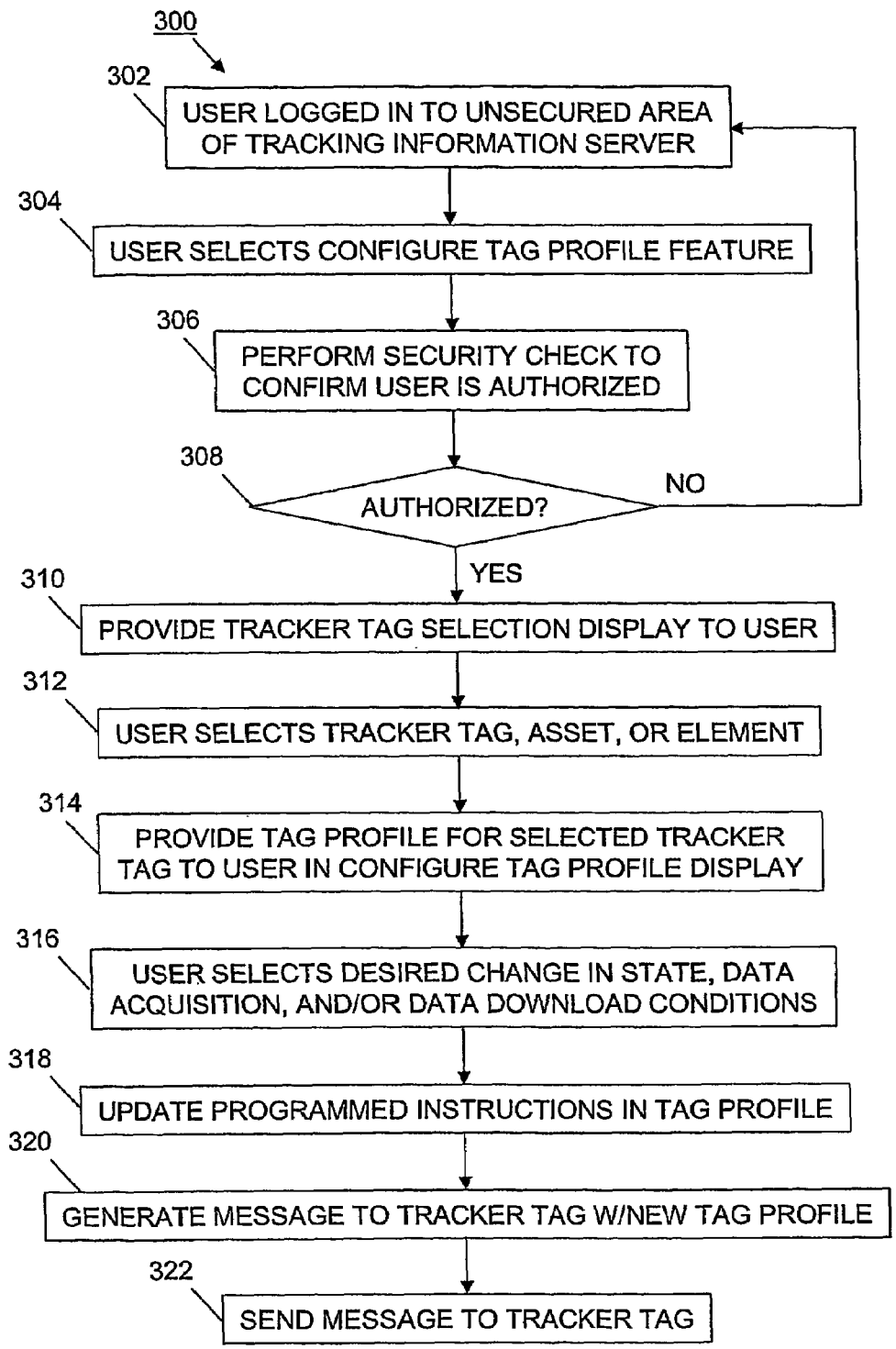
FIG. 20 is a flow chart of an embodiment of operation of a tracking information server to configure change in state, data acquisition, and data download conditions for a tracker tag and send the configured conditions to the tracker tag in a message.

With reference to FIG. 20, an embodiment of a process 300 to configure a tag profile for a tracker tag begins at step 302 where a user is logged into the unsecured area 156 (FIG. 11) of the tracking information server 14 (FIG. 11) using the monitoring device 22 (FIG. 1). At step 304, the user selects a "configure tag profile" feature or option. Next, the tracking information server performs a security check to confirm that the user is authorized to access this area of the tracking information server (step 306; At step 308, the tracking information server determines if the user is authorized to configure tag profiles. Next, if the user is authorized to configure tag profiles, the tracking information server provides a tracker tag selection display to the user on the monitoring device (step 310). Otherwise, the process returns to step 302 because the user is not authorized. At step 312, the user selects a tracker tag, an asset associated with the desired tracker tag, or an element associated with the desired tracker tag for which the tag profile is to be configured. Next, the tracking information server provides the tag profile for the selected tracker tag to the user in a configure tag profile display (step 314). At step 316, the user selects desired change in state, data acquisition, and/or data download conditions to configure the tag profile. Next, when the user saves the desired change in state, data acquisition, and data download conditions, the programmed instructions in the tag profile are updated (step 318). At step 320, the tracking information server generates a message to the selected tracker tag with the newly configured tag profile. Next, the tracking information server sends the message to the selected tracker tag (step 320).

In an addition embodiment of the tag profile configuration process, the user may select any combination of multiple tracker tags, assets, or elements in step 312 when multiple tag profiles are to be commonly configured. This is useful, for example, for configuration of tag profiles associated with a fleet of aircraft, trucks, or other type of vehicles where the tag profiles for like or similar classes of assets are to be commonly configured. The tracker tag selection display in step 310 may include classes of assets and classes of elements to simplify selection of multiple tracker tags for tag profile configuration. When multiple tag profiles are commonly configured, the message in step 322 is sent to multiple corresponding tracker tags.

In one embodiment of the tag profile configuration process, the message maybe an e-mail message sent to an e-mail address associated with the selected tracker tag via the e-mail system (e.g., POP3 e-mail server). In another embodiment, the message may be a text message sent to a text messaging address associated with the selected tracker tag via a text messaging system. In still another embodiment, the message may be a direct data communication to the selected tracker tag. The e-mail and/or text messaging systems may be within the tracking information server or provided by independent service providers.

With reference to FIG. 21, an example of programmed instructions (i.e., command and control information) included in a tag profile 79, 104 is provided. This reflects the programmed instructions in this exemplary tag profile that are directed to operation of the tracker tag whether the tag profile is stored in the tracking information server (i.e., tag profile 104), in a message to the corresponding tracker tag, or stored in the tracker tag (i.e., tag profile 79). Note that the tag profile may also include programmed instructions directed to operation of the tracking information server. Preferably, any programmed instruction directed to operation of the tracking information server are removed from tag profiles in messages to corresponding tracker tags and tag profiles 79 stored in the tracker tags. In this example of a tag profile, the following syntax rules are used: 1) a line beginning with an ampersand (#) is a comment, 2) the end of a line is identified by a semicolon (;), 3) variable are delimited from parameters by two colons (::), and 4) parameters field are delimited by a comma (,). Of course, any suitable syntax may be adopted for the tag profile, particularly common syntax rules for script files. This tag profile is configured for a tracker tag that includes a GPS receiver for receiving GPS position and time data, a vibration sensor, and a temperature sensor. In other embodiments, a tracker tag may include any combination of one or more vibration sensors, temperature sensors, strain gauges, voltage sensors, pressure sensors, and e-field sensors.

Line 1 of the tag profile identifies trackertag ID 123456789. This is a unique tracker tag ID and associates the tag profile with an individual tracker tag having a matching tracker tag ID 78 (FIG. 7).

Lines 2–13 define six change in state conditions. There are no change in state conditions for position line 3) or time (line 4) in this exemplary embodiment There are two change in state conditions for vibration. The first vibration change in state condition is defined as a transition from engine off to engine running (line 5). The second vibration change in state condition is defined as a transition from engine running to engine off and then remaining off for ten minutes (lines 6,7). As described above, an accelerometer in the tracker tag can distinguish between vibrations associated with the engine running and vibrations associated with the engine off. Waiting for the engine to remain off for a period of time ensures that a change in state condition is not detected, for example, when a truck engine is merely shut down for a brief period for refueling. Such a waiting period may be adjusted or removed to suit the asset being tracked. These types of vibration change in state conditions are useful, for example, to log engine time and/or track movement of the asset with which the tracker tag is associated There are two change in state conditions for temperature. The first temperature change in state condition is defined as a rising transition in temperature to greater than 40 degrees F. (line 8). The second change in state condition is defined as a falling transition in temperature to less than 40 degrees F. and then remaining below 40 degrees F. for more than five minutes (lines 9, 10). A temperature sensor can distinguish between greater than 40 degrees F. and less than 40 degrees F. Waiting for the temperature to remain below 40 degrees F. for a period of time ensures that a change in state condition is not detected for an acceptable variation in temperature. Of course, other values may be selected for the upper and/or lower temperature thresholds and the waiting period may be adjusted or removed to suit the asset being monitored. These types of temperature change in state conditions are useful, for example, to monitor refrigerated cargo containers, trucks, and rail cars.

There are two change in state conditions for self-test. One for self-test pass results (line 11) and one for self-test fail results (line 12). There are no paging instructions for any change in state conditions (line 13). A paging instruction could be added for any or all change in state conditions. For example, a paging instruction could be added to page user 456 on a self-test-fail change in state condition where user 456 is a maintenance technician responsible for tracker tag ID 123456789.

Lines 14–27 define six data acquisition conditions. There are data acquisition conditions associated with acquisition and storage of position, time, vibration, temperature, self-test-pass, and self-test-fail data. Each data acquisition condition identifies a change in state condition to which it is related and provides additional instructions for acquisition and storage of certain types of data. The position data acquisition conditions (lines 15, 16) are defined as on each vibration change in state condition and every ten minutes thereafter while the engine is running. In other words, a first position data acquisition condition is detected when the vibration change in state condition on transition to engine running is detected. Then, additional position data acquisition conditions are detected every ten minutes until the vibration change in state condition on transition to engine off is detected. Another position data acquisition condition is detected when the vibration change in state condition on transition to engine off is detected. The time data acquisition conditions (lines 17, 18) are also defined as on each vibration change in state condition and every ten minutes thereafter while the engine is running. This coordinates acquisition and storage of position and time data while the engine is running. This data is useful for logging engine time and tracking movement of the asset.

The vibration data acquisition conditions (lines 19, 20) are defined as on each vibration change in state condition. The vibration data acquisition condition also includes instructions that position and time data is also to be acquired and stored along with the vibration data The temperature data acquisition conditions (lines 21, 22) are defined as on each temperature change in state condition and every five minutes thereafter while the temperature is greater than 40 degrees F. The temperature data acquisition condition also includes instructions that position and time data is also to be acquired and stored along with the temperature data. The self-test-pass data acquisition conditions (lines 23, 24) are defined as on each self-test-pass change in state condition. The self-test-pass data acquisition condition also includes instructions that position and time data is also to be acquired and stored along with the self-test-pass data The self-test-pass data may include information identifying elements of the tracker tag that were tested and corresponding passing results. The self-test-fail data acquisition conditions (lines 25, 26) are defined as on each self-test-fail change in state condition. The self-test-fail data acquisition condition also includes instructions that position and time data is also to be acquired and stored along with the self-test-fail data The self-test-fail data may include information identifying elements of the tracker tag that were tested and corresponding passing or failing results. There are no paging instructions for any data acquisition conditions (line 27). A paging instruction could be added for any or all data acquisition conditions.

Lines 28–39 define three data download conditions and two page instructions. There are no data download conditions for position (line 29), time (line 30), and self-test-pass (line 35) in this exemplary embodiment. There are data download conditions associated with vibration, temperature, and self-test-fail change in state conditions. Each data download condition identifies a change in state condition to which it is related and provides additional instructions for the download of certain types of data. The vibration data download conditions (lines 31, 32) are defined as on each vibration change in state condition and every eight hours thereafter while the engine is running. The vibration data download condition also includes instructions that all stored data (i.e., position, time, temperature, self-test-pass, and self-test-fail) is to be downloaded along with the vibration data The temperature data download conditions (lines 33, 34) are defined as on each temperature change in state condition and every five minutes thereafter while the temperature is greater than 40 degrees F. The temperature data acquisition condition also includes instructions that position and time data is also to be downloaded along with the temperature data The self-test-fail data download conditions (lines 36, 37) are defined as on each self-test-fail change in state condition. The self-test-fail data download condition also includes instructions that position and time data is also to be acquired and stored along with the self-test-fail data.

There are two paging instructions for data download conditions. A first paging instruction specifies that user 123 is to be paged for all data download conditions (line 38). User 123, for example, may be someone assigned to monitor all activities associated with the asset to which tracker tag ID 123456789 is attached. Therefore, whenever new position, time, or sensor data is provided to the tracking information server, the appropriate person is paged so that he/she can log in to the tracking information server and review the new data. The monitor can then take appropriate action to coordinate further movement of the asset. A second paging instruction specifies that user 456 is to be paged for self-test-fail data download conditions (line 39). User 456, for example, may be someone assigned to maintain tracker tag ID 123456789. Therefore, whenever new self-test-fail data is provided to the tracking information server, the appropriate person is pages so that he/she can log in to the tracking information server and review the new data. The maintainer can then take appropriate action to coordinate further use of the tracker tag and schedule maintenance based on the nature of the failure.

The various components and processes described above for the tracking system, including the tracker tag and tracking information server, may be implemented in hardware, software, database structures, or in any suitable combination of hardware, software, and database structures.

While the invention has been described in conjunction with exemplary embodiments, it is to be appreciated that many alternatives, modifications and variations will be apparent to those skilled in the art. Accordingly, the embodiments of the invention in the preceding description are intended to be illustrative rather than limiting, of the spirit and scope of the invention. More specifically, it is intended that the invention embrace all alternatives, modifications and variations of the exemplary embodiments described herein.

What is claimed is:

1. An apparatus (10, 26, 170, 176) for tracking a movable asset (16) and providing tracking information to a monitoring device (22), including:
   a tracker tag (12, 12') adapted to selectively receive position data and time data from multiple global positioning system satellites (240) of a global positioning system satellite constellation (24), the position data representing a position of each global positioning system satellite from which data was received with respect to center of Earth (37) and the time data representing a time of day associated with the position data, the tracker tag disposed along an exterior of the movable asset at a location facilitating reception of the position data and time data, the tracker tag combining the position data from the multiple global positioning system satellites for selectively transmitting combined position data and time data via a data communication network (18), wherein the tracker tag is adapted to selectively retrieve a message with command and control information via the data communication network, wherein the tracker tag is inoperative from equipment associated with the asset; and
   a tracking information server (14) for command and control of the tracker tag, wherein the tracking information server is adapted to selectively send the message with command and control information to the tracker tag via a messaging system (93), wherein the message is addressed to the tracker tag, wherein the messaging system is accessible to the tracker tag via the data communication network, wherein the tracking information server is adapted to receive the combined position data and time data from the tracker tag via the data communication network, wherein the tracking information server is adapted to selectively receive command and control information from the monitoring device via a tracking information network (20), wherein the tracking information server is adapted to selectively process the combined position data and time data based on programmed instructions and command and control information to produce the tracking information, wherein the tracking information is associated with the asset and selectively accessible to the monitoring device via the tracking information network.

2. The apparatus as set forth in claim 1 wherein the messaging system includes at least one of an e-mail system, a text messaging system, and a paging system.

3. The apparatus as set forth in claim 2, the tracking information server including at least the e-mail system of the messaging system, wherein the e-mail system is associated with the message including the command and control information.

4. The apparatus as set forth in claim 2 wherein the e-mail system is associated with the message including the command and control information and provided by an e-mail service provider independent from the tracking information server.

5. The apparatus as set forth in claim 1, the tracker tag including:
   a global positioning system receiver (65) adapted to selectively receive the position data and time data;
   a storage device (72) for storing command and control information associated with operation of the tracker tag and for selectively storing the combined position data and time data; and
   a processor (70) in communication with the global positioning system receiver and storage device, wherein the processor compares at least one of the position data and time data with predetermined thresholds associated with command and control information stored in the storage device to detect at least one of a group of conditions, the group of conditions including: i) one or more change in state conditions, ii) one or more data acquisition conditions, and iii) one or more data download conditions;
   wherein the tracker tag attempts to retrieve a new message from the messaging system upon detection of each change in state condition, wherein the processor stores at least one of the combined position data and time data in the data buffer upon detection of each data acquisition condition, wherein the tracker tag transmits at least one of the combined position data and time data to the tracking information server upon detection of each data download condition.

6. The apparatus as set forth in claim 5 wherein the tracker tag is adapted to selectively send a message to one or more authorized users associated with the monitoring device via the messaging system upon detection of at least one of the one or more change in state conditions, one or more data acquisition conditions, and one or more data download conditions.

7. The apparatus as set forth in claim 6 wherein the messaging system includes at least one of a paging system, an e-mail system, and a text messaging system.

8. The apparatus as set forth in claim 7, the tracking information server including at least the paging system of the messaging system, wherein the paging system is associated with any messages sent to authorized users of the monitoring device upon detection of change in state conditions, data acquisition conditions, and data download conditions.

9. The apparatus as set forth in claim 7 wherein the paging system is associated with the any message sent to authorized users of the monitoring device upon detection of change in state conditions, data acquisition conditions, and data download conditions and provided by a paging service provider independent from the tracking information server.

10. The apparatus as set forth in claim 1, the tracker tag including:
   a global positioning system receiver (65) adapted to selectively receive the position data and time data;
   a storage device (72) for storing command and control information associated with operation of the tracker tag and for selectively storing the combined position data and time data;
   a network processor (63) adapted to selectively retrieve new messages with command and control information from the messaging system and selectively transmit the combined position data and time data to the tracking information server; and
   a sensor processor (71) in communication with the global positioning system receiver, and storage device, and network processor, wherein the sensor processor compares at least one of the position data and time data with predetermined thresholds associated with command and control information stored in the storage device to detect at least one of a group of conditions, the group of conditions including: i) one or more change in state conditions, ii) one or more data acquisition conditions, and iii) one or more data download conditions;
   wherein the sensor processor initiates retrieval a new message from the messaging system by the network processor upon detection of each change in state condition, wherein the sensor processor stores at least one of the combined position data and time data in the data buffer upon detection of each data acquisition condition, wherein the sensor processor initiates transmission of at least one of the combined position data and time data to the tracking information server by the network processor upon detection of each data download condition.

11. The apparatus as set forth in claim 10, the tracker tag further including:
an asset communication interface (75) in communication with the sensor processor to provide a communication path between the sensor processor and at least one of the asset and a transport vehicle associated with the asset.

12. The apparatus as set forth in claim 11 wherein the asset communication interface is adapted to selectively receive sensor information from one or more of at least one asset sensor and at least one transport vehicle sensor, and at least one operational sensor associated with the transport vehicle, wherein the sensor processor compares the sensor information with corresponding predetermined thresholds associated with command and control information stored in the storage device to detect at least one of the one or more change in state conditions, one or more data acquisition conditions, and one or more data download conditions.

13. The apparatus as set forth in claim 12 wherein the asset communication interface is adapted to selectively transmit command and control information to one or more of at least one asset control device and at least one transport vehicle control device, wherein the sensor processor also compares at least one of the position data, time data, and sensor information with predetermined thresholds associated with command and control information stored in the storage device to detect one or more asset/transport vehicle control conditions, wherein the sensor processor transmits asset/transport vehicle control information to the one or more of at least one asset control device and at least one transport vehicle upon detection of each asset/transport vehicle control condition to control one or more aspect of operation of at least one of the asset and transport vehicle.

14. The apparatus as set forth in claim 11 wherein the asset communication interface is adapted to selectively transmit command and control information to one or more of at least one asset control device and at least one transport vehicle control device, wherein the sensor processor also compares at least one of the position data and time data with predetermined thresholds associated with command and control information stored in the storage device to detect one or more asset/transport vehicle control conditions, wherein the sensor processor transmits asset/transport vehicle control information to the one or more of at least one asset control device and at least one transport vehicle upon detection of each asset/transport vehicle control condition to control one or more aspect of operation of at least one of the asset and transport vehicle.

15. The apparatus as set forth in claim 1, the tracker tag including:
a global positioning system receiver (65) adapted to selectively receive the position data and time data;
an environmental sensor (66) for sensing an environmental condition;
a storage device (72) for storing command and control information associated with operation of the tracker tag and for selectively storing the combined position data, time data, and sensor data associated with the environmental sensor; and
a processor (70) in communication with the global positioning system receiver, environmental sensor, and storage device, wherein the processor compares measurements from the environmental sensor with predetermined thresholds associated with command and control information stored in the storage device to detect at least one of a group of conditions, the group of conditions including: i) one or more change in state conditions, ii) one or more data acquisition conditions, and iii) one or more data download conditions;
wherein the tracker tag attempts to retrieve a new message from the messaging system upon detection of each change in state condition, wherein the processor stores at least one of the combined position data, time data, and sensor data in the data buffer upon detection of each data acquisition condition, wherein the tracker tag transmits at least one of the combined position data, time data, and sensor data to the tracking information server upon detection of each data download condition.

16. The apparatus as set forth in claim 15, wherein the environmental sensor includes at least one of a vibration sensor, a temperature sensor, a strain gauge, a voltage sensor, a pressure sensor, and an electric field sensor.

17. The apparatus as set forth in claim 1, the tracker tag including:
a global positioning system receiver (65) adapted to selectively receive the position data and time data;
an environmental sensor (66) for sensing an environmental condition;
a storage device (72) for storing command and control information associated with operation of the tracker tag and for selectively storing the combined position data, time data, and sensor data associated with the environmental sensor;
a network processor (63) adapted to selectively retrieve new messages with command and control information from the messaging system and selectively transmit the combined position data and time data to the tracking information server; and
a sensor processor (71) in communication with the global positioning system receiver, and storage device, and network processor, wherein the processor compares measurements from the environmental sensor with predetermined thresholds associated with command and control information stored in the storage device to detect at least one of a group of conditions, the group of conditions including: i) one or more change in state conditions, ii) one or more data acquisition conditions, and iii) one or more data download conditions;
wherein the sensor processor initiates retrieval a new message from the messaging system by the network processor upon detection of each change in state condition, wherein the sensor processor stores at least one of the combined position data and time data in the data buffer upon detection of each data acquisition condition, wherein the sensor processor initiates transmission of at least one of the combined position data and time data to the tracking information server by the network processor upon detection of each data download condition.

18. The apparatus as set forth in claim 17, wherein the environmental sensor includes at least one of a vibration sensor, a temperature sensor, a strain gauge, a voltage sensor, a pressure sensor, and an electric field sensor.

19. The apparatus as set forth in claim 1 wherein the messaging system includes an e-mail system.

20. The apparatus as set forth in claim 19, wherein the e-mail system is associated with the message including the command and control information.

21. The apparatus as set forth in claim 20 wherein the e-mail system is provided by an e-mail service provider independent from the tracking information server.

22. A tracking system (10, 26, 170, 176), including:
   a monitoring device (22) for displaying tracking information associated with a movable asset (16);
   a tracking information network (20) in communication with the monitoring device for communicating the tracking information to the monitoring device;
   a data communication network (18);
   a tracker tag (12, 12') adapted to selectively receive position data and time data from multiple global positioning system satellites (240) of a global positioning system satellite constellation (24), the position data representing a position of each global positioning system satellite from which data was received with respect to center of Earth (37) and the time data representing a time of day associated with the position data, the tracker tag disposed along an exterior of the movable asset at a location facilitating reception of the position data and time data, the tracker tag combining the position data and time data from the multiple global positioning system satellites for selectively transmitting combined position data and time data via the data communication network, wherein the tracker tag selectively retrieves command and control information via the data communication network; and
   a tracking information server (14) for command and control of the tracker tag, wherein the tracking information server selectively sends command and control information to the tracker tag via a messaging system (93), wherein the message is addressed to the tracker tag, wherein the messaging system is accessible to the tracker tag via the data communication network, wherein the tracking information server receives combined position data and time data from the tracker tag via the data communication network, wherein the tracking information server selectively receives command and control information from the monitoring device via the tracking information network, wherein the tracking information server selectively processes the combined position data and time data to produce the tracking information, wherein the tracking information is selectively accessible to the monitoring device via the tracking information network.

23. A method for monitoring sensor data associated with a moveable asset using a tracker tag in communication with a tracking information server, including the steps:
   a) attaching a tracker tag to the moveable asset, wherein the tracker tag is disposed along an exterior of the movable asset at a location in which the tracker tag has line of sight access to the sky during normal movement of the asset, wherein the tracker tag is inoperative from equipment associated with the asset, wherein the tracker tag includes an installed tag profile that includes programmed instructions to control current operation of the tracker tag, wherein the tracking information server includes a master tag profile that is re-configurable and at least initially the same as the installed tag profile;
   b) re-configuring the master tag profile at the tracking information server to create a next tag profile, wherein the next tag profile includes programmed instructions to control subsequent operation of the tracker tag;
   c) selectively sending the next tag profile to the tracker tag in a message via a messaging system, wherein the messaging system is accessible to the tracker tag via a data communication network;
   d) powering up the tracker tag;
   e) detecting a change in state condition with the tracker tag and responding to the change in state condition in accordance with the programmed instructions in the installed tag profile, wherein the response to the change in state condition includes retrieving the message with the next tag profile from the messaging system and installing the next tag profile in the tracker tag, wherein, upon installation, the next tag profile becomes the installed tag profile for control of current operations of the tracker tag;
   f) detecting a data acquisition condition with the tracker tag and responding to the data acquisition condition in accordance with the programmed instructions in the installed tag profile, wherein the response to the data acquisition condition includes acquiring and storing sensor data associated with at least one sensor of one or more sensors associated with the tracker tag, one or more sensors associated with the asset, and one or more sensors associated with a transport vehicle associated with the asset; and
   g) detecting a data download condition with the tracker tag and responding to the data download condition in accordance with the programmed instructions in the installed tag profile, wherein the response to the data download condition includes downloading the stored sensor data to the tracking information server via the data communication network, wherein the tracking information server processes the downloaded sensor data to create sensor information and displays the sensor information on a monitoring device via a tracking information network.

24. The method as set forth in claim 23 wherein the messaging system is an e-mail system.

25. The method as set forth in claim 24 wherein the e-mail system is included within the tracking information server.

26. The method as set forth in claim 24 wherein the e-mail system is provided by an e-mail service provider independent from the tracking information server.

27. The method as set forth in claim 23 wherein the tracker tag includes a processor in communication with the at least one sensor, wherein the processor compares measurements from the each sensor of the at least one sensor with predetermined thresholds within the programmed instructions in the installed tag profile to detect each change in state, data acquisition, and data download condition.

28. The method as set forth in claim 23, step b) further including the following steps:
   h) receiving a selection from a user of the monitoring device to re-configure the master tag profile;
   i) if the user is authorized to re-configure the master tag profile, providing the user with a configure tag profile display to re-configure the master tag profile;
   j) receiving one or more selections from the user in conjunction with one or more desired change in state conditions, one or more desired data acquisition conditions, and one or more desired data download conditions associated with subsequent operation of the tracker tag;
   k) updating the programmed instructions in the master tag profile based on the desired change in state, data acquisition, and data download conditions to create the next tag profile; and l) generating the message with the next tag profile to be sent to the messaging system.

29. The method as set forth in claim 23, step d) further including the following steps:
   h) performing a self-test of the tracker tag; and
   i) determining if the self-test passed or failed, wherein the programmed instructions in the installed tag profile identify change in state conditions for passing self-test and for failing self-test.

30. The method as set forth in claim 23, step e) further including the following steps:
   h) waking up a sensor processor in the tracker tag, wherein the sensor processor detected the change in state condition based on detecting at least one parameter identified as a change in state condition in the programmed instructions associated with the installed tag profile;
   i) starting up a network processor in the tracker tag;
   j) initiating a communication between the network processor and the messaging system;
   k) after communication between the network processor and the messaging system is confirmed, checking for a new message to the tracker tag and, if a new message is found, uploading the next tag profile associated with the new message to the network processor;
   l) terminating the communication between the network processor and the messaging system;
   m) passing the next tag profile from the network processor to the sensor processor and shutting down the network processor;
   n) if a new message was found in step k), installing the next tag profile in a storage device associated with the sensor processor, wherein, upon installation, the programmed instructions of the next tag profile previously associated with subsequent operation of the tracker tag transition to programmed instructions in the installed tag profile for control of current operations of the tracker tag; and
   o) placing the sensor processing in a sleep state.

31. The method as set forth in claim 23, step f) further including the following steps:
   h) waking up a sensor processor in the tracker tag, wherein the sensor processor detected the data acquisition condition based on detecting at least one parameter identified as a data acquisition condition in the programmed instructions associated with the installed tag profile;
   i) acquiring and storing sensor data associated with at least one sensor of the tracker tag, asset, and transport vehicle in accordance with the programmed instructions in the installed tracker tag; and
   j) placing the sensor processing in a sleep state.

32. The method as set forth in claim 23, step g) further including the following steps:
   h) waking up a sensor processor in the tracker tag, wherein the sensor processor detected the data download condition based on detecting at least one parameter identified as a data download condition in the programmed instructions associated with the installed tag profile;
   i) starting up a network processor in the tracker tag;
   j) initiating a communication between the network processor and the tracking information server;
   k) after communication between the network processor and the tracking information server is confirmed, downloading the stored sensor data from a storage device associated with the sensor processor through the network processor to the tracking information server via the data communication network;
   l) terminating the communication between the network processor and the tracking information server;
   m) shutting down the network processor; and
   n) placing the sensor processing in a sleep state.

33. The method as set forth in claim 32, between steps j) and k) further including the following step:
   o) after communication between the network processor and the tracking information server is confirmed, sending a page to a paging system addressed to one or more users associated with the monitoring device in accordance with the programmed instructions in the installed tag profile.

34. The method as set forth in claim 33 wherein the paging system is included within the tracking information server.

35. The method as set forth in claim 33 wherein the paging system is provided by a paging service provider independent from the tracking information server.

36. A method for tracking a moveable asset using a tracker tag in communication with a tracking information server, including the steps:
   a) attaching a tracker tag to the moveable asset, wherein the tracker tag is disposed along an exterior of the movable asset at a location in which the tracker tag has line of sight access to the sky during normal movement of the asset, wherein the tracker tag is inoperative from equipment associated with the asset, wherein the tracker tag includes an installed tag profile that includes programmed instructions to control current operation of the tracker tag, wherein the tracking information server includes a master tag profile that is re-configurable and at least initially the same as the installed tag profile;
   b) re-configuring the master tag profile at the tracking information server to create a next tag profile, wherein the next tag profile includes programmed instructions to control subsequent operation of the tracker tag;
   c) selectively sending the next tag profile to the tracker tag in a message via a messaging system, wherein the messaging system is accessible to the tracker tag via a data communication network;
   d) powering up the tracker tag;
   e) detecting a change in state condition with the tracker tag and responding to the change in state condition in accordance with the programmed instructions in the installed tag profile, wherein the response to the change in state condition includes retrieving the message with the next tag profile from the messaging system and installing the next tag profile in the tracker tag, wherein, upon installation, the next tag profile becomes the installed tag profile for control of current operations of the tracker tag;
   f) detecting a data acquisition condition with the tracker tag and responding to the data acquisition condition in accordance with the programmed instructions in the installed tag profile, wherein the response to the data acquisition condition includes acquiring and storing position data and time data associated with a global positioning system receiver in the tracker tag; and
   g) detecting a data download condition with the tracker tag and responding to the data download condition in accordance with the programmed instructions in the installed tag profile, wherein the response to the data download condition includes downloading the stored position data and time data to the tracking information server via the data communication network, wherein the tracking information server processes the downloaded position data and time data to create tracking information and displays the tracking information on a monitoring device via a tracking information network.

37. The method as set forth in claim 36 wherein the tracker tag includes a processor in communication with the global positioning system receiver, wherein the processor compares at least one of the position data and time data with predetermined thresholds within the programmed instructions in the installed tag profile to detect each change in state, data acquisition, and data download condition.

38. The method as set forth in claim 36, step e) further including the following steps:
  h) waking up a sensor processor in the tracker tag, wherein the sensor processor detected the change in state condition based on detecting at least one parameter identified as a change in state condition in the programmed instructions associated with the installed tag profile;
  i) starting up a network processor in the tracker tag;
  j) initiating a communication between the network processor and the messaging system;
  k) after communication between the network processor and the messaging system is confirmed, checking for a new message to the tracker tag and, if a new message is found, uploading the next tag profile associated with the new message to the network processor;
  l) terminating the communication between the network processor and the messaging system;
  m) passing the next tag profile from the network processor to the sensor processor and shutting down the network processor;
  n) if a new message was found in step k), installing the next tag profile in a storage device associated with the sensor processor, wherein, upon installation, the programmed instructions of the next tag profile previously associated with subsequent operation of the tracker tag transition to programmed instructions in the installed tag profile for control of current operations of the tracker tag; and
  o) placing the sensor processing in a sleep state.

39. The method as set forth in claim 36, step f) further including the following steps:
  h) waking up a sensor processor in the tracker tag, wherein the sensor processor detected the data acquisition condition based on detecting at least one parameter identified as a data acquisition condition in the programmed instructions associated with the installed tag profile;
  i) acquiring and storing the position data and time data in accordance with the programmed instructions in the installed tracker tag; and
  j) placing the sensor processing in a sleep state.

40. The method as set forth in claim 36, step g) further including the following steps:
  h) waking up a sensor processor in the tracker tag, wherein the sensor processor detected the data download condition based on detecting at least one parameter identified as a data download condition in the programmed instructions associated with the installed tag profile;
  i) starting up a network processor in the tracker tag;
  j) initiating a communication between the network processor and the tracking information server;
  k) after communication between the network processor and the tracking information server is confirmed, downloading the stored position data and time data from a storage device associated with the sensor processor through the network processor to the tracking information server via the data communication network;
  l) terminating the communication between the network processor and the tracking information server;
  m) shutting down the network processor; and
  n) placing the sensor processing in a sleep state.

* * * * *